United States Patent
Sasaki et al.

(10) Patent No.: US 7,249,124 B2
(45) Date of Patent: Jul. 24, 2007

(54) ADAPTIVE INFORMATION-RETRIEVAL SYSTEM

(75) Inventors: Mikio Sasaki, Kariya (JP); Fumihiko Murase, Nagoya (JP)

(73) Assignee: DENSO Corporation, Kariya (JP)

( * ) Notice: Subject to any disclaimer, the term of this patent is extended or adjusted under 35 U.S.C. 154(b) by 503 days.

(21) Appl. No.: 10/373,683

(22) Filed: Feb. 27, 2003

(65) Prior Publication Data
US 2003/0167263 A1    Sep. 4, 2003

(30) Foreign Application Priority Data
Mar. 4, 2002  (JP) .............................. 2002-057307

(51) Int. Cl.
*G06F 17/30*    (2006.01)
(52) U.S. Cl. .......................................... 707/3; 707/100
(58) Field of Classification Search ................ 707/1–6, 707/100, 104.1
See application file for complete search history.

(56) References Cited

U.S. PATENT DOCUMENTS 5,970,450 A * 10/1999 Hattori ....................... 704/239
5,983,237 A * 11/1999 Jain et al. ................. 707/104.1
2002/0083065 A1    6/2002 Sasaki et al. ............... 707/100

FOREIGN PATENT DOCUMENTS

JP    A-6-68153    3/1994
JP    A-6-195388    7/1994

OTHER PUBLICATIONS

Katsuji Bessho, "Text Segmentation Using Word Conceptual Vectors," *Jyohoshori-gakkai Ronbunshi*, vol. 42, No. 11, Nov. 2001, pp. 2650-2662.

* cited by examiner

*Primary Examiner*—Cheryl Lewis
(74) *Attorney, Agent, or Firm*—Posz Law Group, PLC

(57) ABSTRACT

A vector retrieval/generation/correction unit of a user terminal generates, corrects, and optimizes an inquiry vector on the basis of a vector profile, an inquiry history, a user model, and a user profile. On the other hand, a vector retrieval/generation/correction unit in an information center generates/corrects/optimizes a feature vector on the basis of a vector table, a search history, and a contents description database. In the information center, when an inquiry profile including an inquiry vector is transmitted from the user terminal, an adaptive searching process is executed. According to evaluation made by a contents evaluating unit, proper contents are retrieved from a contents database.

8 Claims, 26 Drawing Sheets

FIG. 4

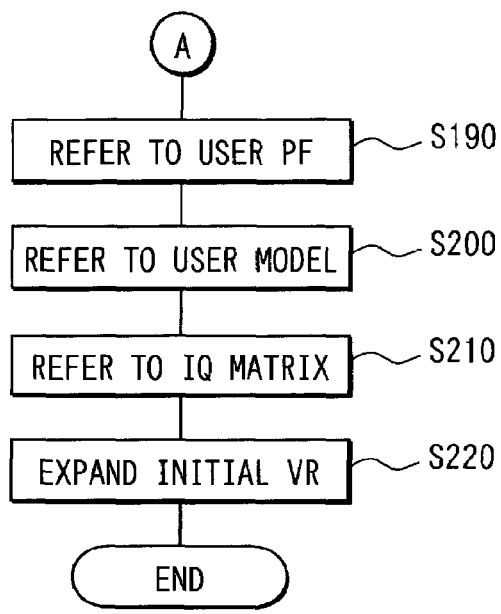

- REFER TO USER PF — S190
- REFER TO USER MODEL — S200
- REFER TO IQ MATRIX — S210
- EXPAND INITIAL VR — S220
- END

FIG. 5

REPRESENTATIVE VR VALUE TABLE

| KW | IQ VR |
|---|---|
| TRAFFIC JAM STATE | F F 0 3 E 6 F A |
| CONGESTION | F C 0 8 0 6 F 0 |
| SIGHTSEEING | F 8 0 E 4 6 F 0 |
| VIDEO MAIL, TV PHONE | 1 A F 5 0 6 F 0 |
| TRAFFIC JAM STATE, DIRECTION | F F 0 3 E 6 F 0 |
| CONGESTION, SHOPPING | F 2 0 4 A 6 F 0 |
| DIRECTION, SIGHTSEEING | F 2 0 2 3 6 F 0 |
| SIGHTSEEING, SHOPPING | F 3 0 D A 6 F 0 |
| DIRECTION, SIGHTSEEING, SHOPPING | F 3 0 E 2 6 F 0 |
| SIGHTSEEING, EVENT, SHOPPING | F 2 0 F B 6 F 0 |

DEPENDENCE ON PLACE
DEPENDENCE ON TIME
DEPENDENCE ON ACTOR
DEPENDENCE ON GENRE
DEPENDENCE ON WEATHER
DEPENDENCE ON SIZE OF CONTENTS
DEPENDENCE ON CODING
DEPENDENCE ON COST OF CONTENTS

FIG. 6

VR ATB BASE TABLE

| ATB \ CLASS | DEPENDENCE ON TIME OF USER | DEPENDENCE ON PLACE OF USER | ... | "DEPENDENCE ATB" | ... | "ATB" | ... |
|---|---|---|---|---|---|---|---|
| P:MOBILE PROFILE | O | O | | | | | |
| P:HOME PROFILE | O | | | | | | |
| ........ | | | | | | | |
| A:TRAFFIC JAM SEARCH | O | O | O | O | | | |
| A:RESTAURANT SEARCH | | | O | O | | | |
| A:SKIING GROUND SEARCH | | | | O | O | O | |
| ........ | | | | | | | |
| T:NEWS SEARCH | O | | | | O | | |
| ........ | | | | | | O | |

FIG. 11

| FACTOR | S-PLACE | S-TIME | ACTOR | GENRE | WEATHER | C-SIZE | COD-SCH | COST |
|---|---|---|---|---|---|---|---|---|

| TITLE | ATB | | | | | | | | (CATEGORY) |
|---|---|---|---|---|---|---|---|---|---|
| YOKOHAMA IC | PLACE | F | F | 0 | 3 | E | 6 | F | A | (TRAFFIC JAM STATE) |
| NISSIN | PLACE | F | F | 0 | 3 | E | 6 | F | 0 | (CONGESTION, DIRECTION) |
| SUZAN | ACTOR | 1 | A | F | 5 | 0 | 6 | F | 0 | (VIDEO MAIL, TV PHONE) |
| FORMAN | ACTOR | 1 | A | F | 5 | 0 | 6 | F | 0 | (VIDEO MAIL, TV PHONE) |
| GARDEN PLACE | PLACE | F | 3 | 0 | D | A | 6 | F | 0 | (SIGHTSEEING, SHOPPING) |
| SHINJUKU TAKASHIMAYA | PLACE | F | 3 | 0 | E | 2 | 6 | F | 0 | (DIRECTION, SIGHTSEEING, SHOPPING) |
| NG CASTLE | PLACE | F | 8 | 0 | E | 4 | 6 | F | 0 | (SIGHTSEEING) |
| NG STATION | PLACE | F | C | 0 | 8 | 0 | 6 | F | 0 | (CONGESTION) |
| SAKAE | PLACE | F | 2 | 0 | F | B | 6 | F | 0 | (SIGHTSEEING, EVENT, SHOPPING) |
| TSURUMAI | PLACE | F | 2 | 0 | 2 | 3 | 6 | F | 0 | (CONGESTION) |
| SHINJUKU EAST | PLACE | F | 2 | 0 | 4 | A | 6 | F | 0 | (DIRECTION, SIGHTSEEING) |
| SHINJUKU SOUTH | PLACE | F | E | 0 | 7 | 2 | 6 | F | 0 | (CONGESTION, SHOPPING) |
| NG TOWER | PLACE | F | 3 | 0 | A | 7 | 6 | F | 0 | (DIRECTION, SIGHTSEEING) |
| NG CITY HALL | PLACE | F | 3 | 0 | A | 7 | 6 | F | 0 | (DIRECTION, SIGHTSEEING) |

ADAPTIVE INFORMATION-RETRIEVAL SYSTEM

CROSS REFERENCE TO RELATED APPLICATIONS

This application is based on and incorporates herein by reference Japanese Patent Application No. 2002-57307 filed on Mar. 4, 2002.

FIELD OF THE INVENTION

The present invention relates to a high-speed search engine and, more particularly, to a technique of retrieving proper contents at high speed while grasping a user request.

BACKGROUND OF THE INVENTION

In recent years, with explosive spread of the Internet, various high-speed search engines are used.

The current information retrieving methods are broadly classified into the following two methods.

Full text search: by inputting some keywords, a document including the input keywords is retrieved.

Similarity search: by designating an index search and a document or keyword as an input search key, a document similar to the designated input search key is retrieved.

However, there is limitation in the searches using a so-called keyword and a number of pieces of unnecessary information are hit as a result of a search, so that information which is really needed cannot be obtained. A vague request of the user cannot be grasped.

One of methods of solving the problems uses a vector space model (VSM). According to the method, the presence/absence or the number of appearing times of a word in an input document is used as a feature amount and the degree of similarity between data to be retrieved and an input document is calculated. In the method using the VSM, a feature vector calculating method and a distance between vectors are actively being studied. SMART of the Cornell University, Okapi of City University, INQUERY of the Massachusetts University, and the like are known. According to those methods, however, since a vector is constructed by using frequency of occurrence of a word included in a document as an axis, although a relation to a search keyword is known, semantic feature of the contents of the document and compatibility to the intention of a search of the user cannot be evaluated.

The applicant of the present invention therefore has proposed a high-speed search method using a dependent vector in Japanese Patent Application No. 2001-1365. According to the method, the degree of interest of the user in various attribute groups regarding semantic features of the contents is defined as dependence to form a vector. Consequently, a user request can be quantitatively expressed and both a high-speed search and a similar search adapted to the user can be realized.

However, the search method still has room for improvement with respect to mainly the following points:

1) It is difficult to automatically generate and optimize an inquiry description.
2) It is difficult to automatically generate and optimize a contents description.

Further, from the viewpoint of adaptation to the user, 3) adaptation of a search process
4) learning and updating of a system are desired.

SUMMARY OF THE INVENTION

An object of the present invention is to provide an information-retrieval system inclusively functioning by further expanding the idea of a dependent vector. A first object is to automatically generate and optimize an inquiry description, a second object is to automatically generate and optimize a contents description, a third object is to optimize a search process, and a fourth object is to learn and update a system.

To achieve the above objects, an adaptive information-retrieval system is provided with the following. Here, an adaptive information-retrieve uses inquiry information corresponding to an inquiry and feature information added to contents to be retrieved. At least a part of both of the inquiry information and the feature information is information defined as a vector. In accordance with a first aspect of the present invention, in an adaptive information-retrieval system, the contents are evaluated by using the inquiry information and the feature information, and the inquiry information is generated according to a state of a user. In accordance with a second aspect, in an adaptive information-retrieval system, the contents are evaluated by using the inquiry information and the feature information, and the feature information is generated in correspondence with the contents. In accordance with a third aspect, in an adaptive information-retrieval system, the contents are evaluated by using the inquiry information and the feature information, and the contents are adaptively evaluated. Furthermore, in accordance with a fourth aspect, in an adaptive information-retrieval system, the contents are evaluated by using the inquiry information and the feature information, and stored information is updated on the basis of a search result.

The above structures each enables a high-speed search to be performed by using the inquiry information corresponding to the inquiry and the feature information added to contents to be retrieved.

BRIEF DESCRIPTION OF THE DRAWINGS

The above and other objects, features and advantages of the present invention will become more apparent from the following detailed description made with reference to the accompanying drawings. In the drawings:

FIG. 4 is a flowchart showing a later portion of the inquiry generating process;

FIG. 5 is an explanatory diagram showing a representative vector value correspondence table;

FIG. 6 is an explanatory diagram showing a vector attribute base table;

FIG. 11 is an explanatory diagram showing specification of a feature vector by a table;

DETAILED DESCRIPTION OF THE PREFERRED EMBODIMENTS

An embodiment of the invention will be described hereinbelow with reference to the drawings.

Figure 1:
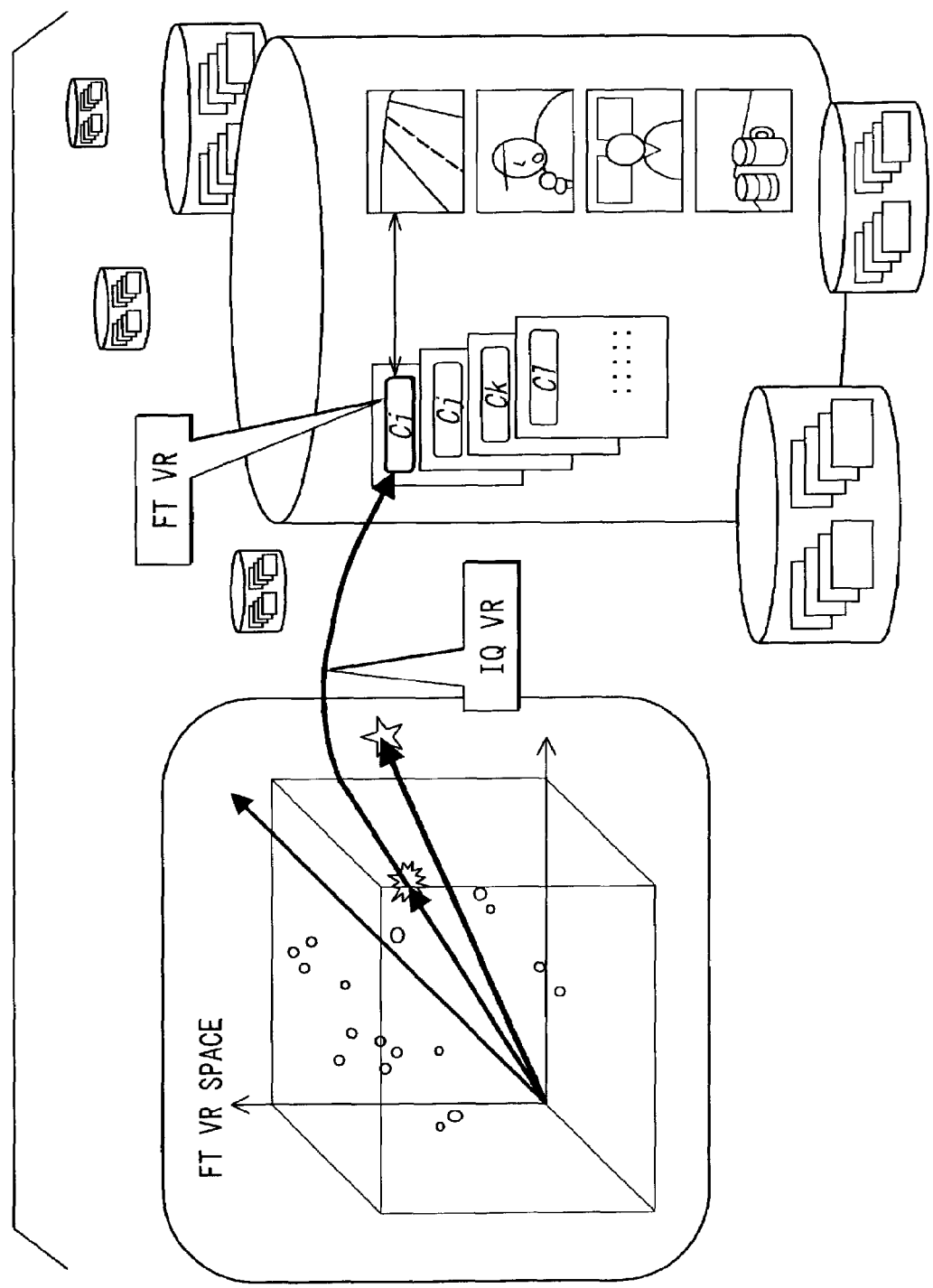
FIG. 1 is an explanatory diagram showing information retrieval based on vectors.

An object of an information-retrieval system of the embodiment is, as shown in FIG. 1, to properly and promptly retrieve contents requested by a user on the basis of evaluations of a feature (FT) vector (VR) and an inquiry (IQ) vector. A technique for realizing such a retrieving method as a real system will be disclosed hereinbelow. The invention is not limited to the following embodiments and, obviously, variation of the invention is possible without departing from the gist of the invention.

Figure 2:
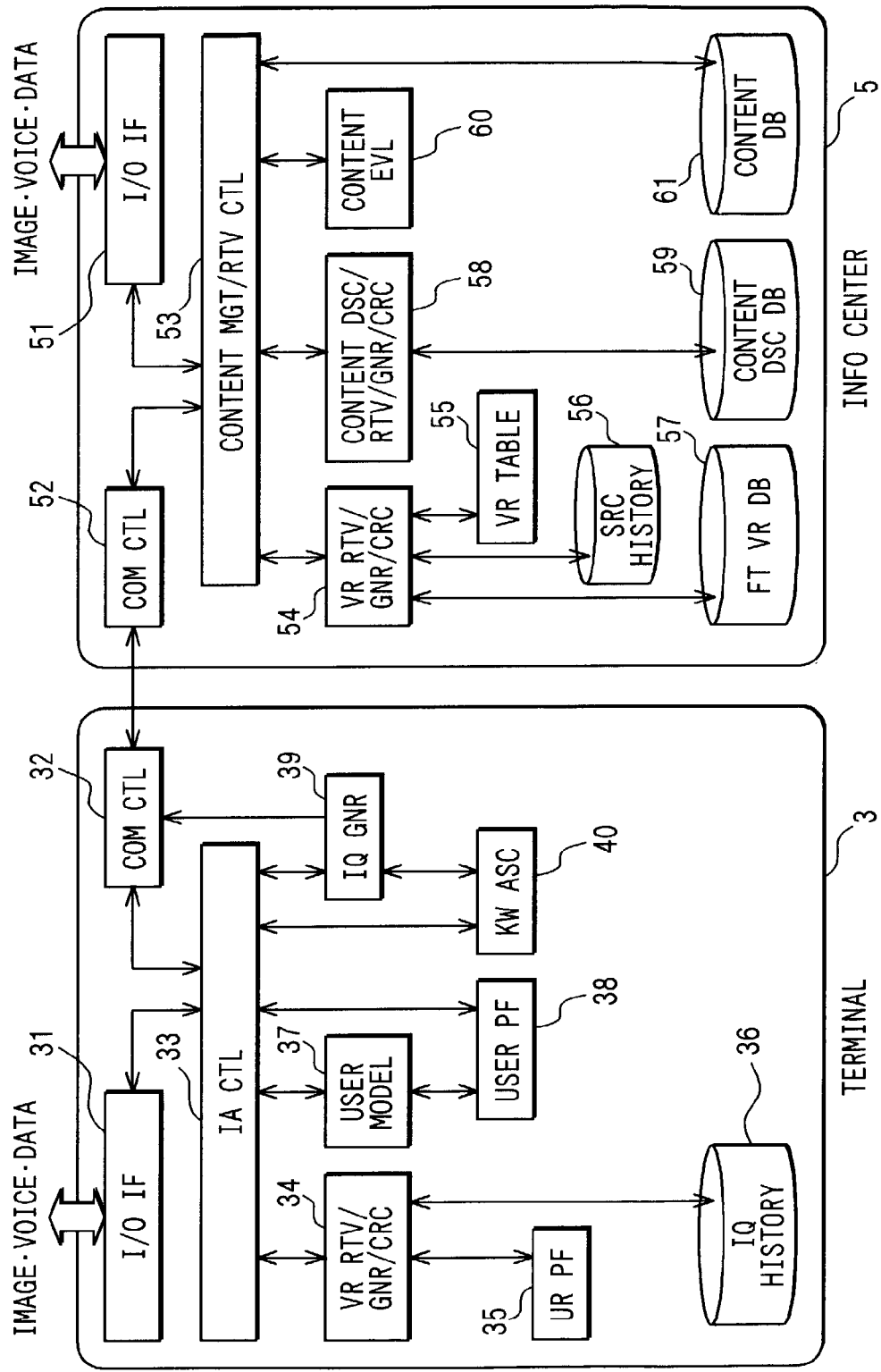
FIG. 2 is an explanatory diagram showing a configuration of a retrieval system of an embodiment.

FIG. 2 shows the whole configuration of the information-retrieval system of the embodiment.

The system includes a user terminal 3 and an information center 5.

The user terminal 3 has an external input/output interface (I/O IF) 31, a communication control unit (COM CTL) 32, an interactive control unit (IA CTL) 33, a vector retrieval/generation/correction unit (VR RTV/GNR/CRC) 34, a vector profile (VR PF) 35, an inquiry history (IQ HISTORY) 36, a user model 37, a user profile (USER PF) 38, an inquiry generating unit (IQ GNR) 39, and a keyword (KW) association unit (KW ASC) 40.

The information center (INFO CENTER) 5 has an external input/output interface (I/O IF) 51, a communication control unit (COM CTL) 52, a contents management and retrieval control unit (CONTENT MGT/RTV CONTROL) 53, a vector retrieval/generation/correction unit (VR RTV/GNR/CRT) 54, a vector table (VR TABLE) 55, a search history (SRC HISTORY) 56, a feature vector database (FT VR DB) 57, a contents description retrieval/generation/correction unit (CONTENT DSC RTV/GNR/CRC) 58, a contents description database (CONTENT DSC DB) 59, a contents evaluation unit (CONTENT EVL) 60, and a contents database (CONTENT DB) 61.

In the embodiment, the user terminal 3 and the information center 5 are constructed as separate modules which are connected via communication means. However, the functions of the user terminal 3 and the information center 5 can be constructed integrally and stored in a single computer. A communication method between the user terminal 3 and the information center 5 may be data transfer in a single circuit or software irrespective of wired or wireless communication. In the case of a configuration of the wireless communication, an information-retrieval system as a function of a navigation system can be constructed by mounting the user terminal 3 in a vehicle. In the embodiment, the case where the user terminal 3 is mounted on a vehicle will be properly described as an example.

First, functions of the blocks will be roughly described.

The external input/output interface 31 in the user terminal 3 has an input/output configuration for inputting utterance, video images, and texts from the user and outputting sound, video images, and texts.

The interactive control unit 33 performs the whole interactive control and transmits an instruction to the vector retrieval/generation/correction unit 34 and the like.

The vector retrieval/generation/correction unit 34 generates and corrects an inquiry vector on the basis of a keyword and an instruction from the interactive control unit 33 by properly referring to the vector profile 35 and the inquiry history 36. The vector retrieval/generation/correction unit 34 can also make a correction on the basis of the user model 37 and the user profile 38.

The user model 37 is obtained by modeling and describing information of each user. In the user profile 38, on the basis of process results of the interactive control unit 33 and the user model 37, present values of the environments, conditions, requests, states, actions, aspects, and the like of the user, taste information of the user, and the like are written.

The inquiry generating unit 39 generates an inquiry profile constructed by an inquiry vector and a keyword. The keyword association unit 40 expands a keyword in the inquiry profile generation.

The communication control unit 32 transmits the generated inquiry profile to the information center 5 and transfers the retrieval result and the state information received from the information center 5 to the interactive control unit 33.

The communication control unit 52 in the information center 5 transmits an inquiry profile from the user terminal 3 to the contents management and retrieval control unit 53 and also transmits a search result and state information to the user terminal 3.

The external input/output interface 51 is a mechanism of transmitting/receiving video images, sound, data, and the like to/from the outside.

The contents management and retrieval control unit 53 controls the operations of the whole information center 5 and gives an instruction to the vector retrieval/generation/correction unit 54 and the contents description retrieval/generation/correction unit 58.

The vector retrieval/generation/correction unit 54 searches the feature vector database 57 on the basis of an instruction and an inquiry vector received from contents management/retrieval control unit 53 and the search history 56 and returns a search result to the contents management/retrieval control unit 53. At the time of new registration of contents, on the basis of external information, an initial value of a feature vector is generated by referring to the vector table 55. The initial vector is corrected and expanded in consideration of matching with an inquiry, learning based on the search history 56, updating of the system, and user information.

The contents evaluation unit 60 searches the contents database 61 and makes a primary evaluation on the contents on the basis of the corrected and expanded inquiry vector and feature vector.

The contents description database 59 is analyzed by the contents retrieval/generation/correction unit 58 only when the primary evaluation result of the feature vector (primary evaluation result of the contents) satisfies a predetermined condition, and a secondary evaluation is made by the contents evaluation unit 60. Only the contents corresponding to the contents description finally satisfying the search condition are distributed to the user terminal 3 via the communication control unit 52 by the contents management and retrieval control unit 53.

The detailed operation in the retrieval system constructed as described above will be described hereinbelow. For convenience, the description is divided into items which are sequentially numbered as <1>, 1, (1), and [1].

<1>User Terminal 3

Figure 3:
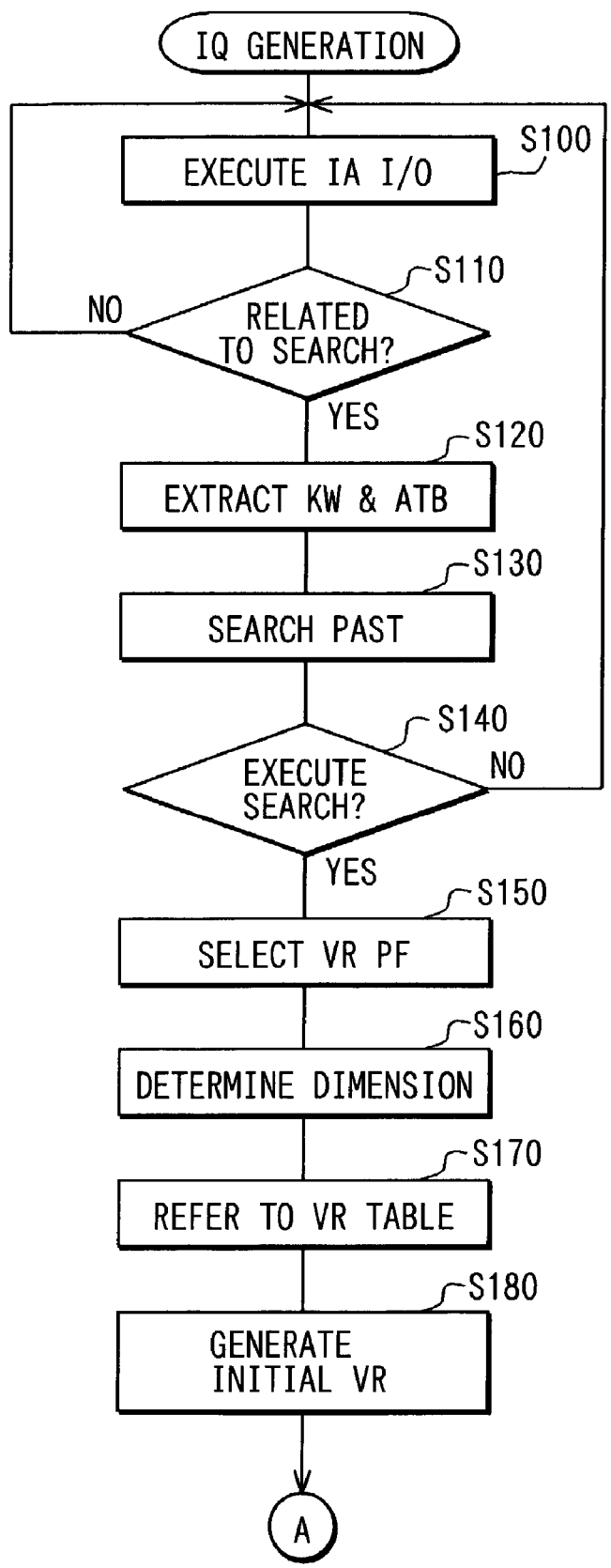
FIG. 3 is a flowchart showing an earlier portion of an inquiry generating process.

FIGS. 3 and 4 are flowcharts showing an inquiry generating process executed by the user terminal 3.

In Step 100, interactive input/output is performed. The process is executed by the interactive control unit 33 via the external input/output interface 31. In Step 110, whether utterance is related to a search or not is determined. When it is determined that the utterance is related to the search (YES in Step 110), the program advances to Step 120. On the other hand, when it is determined that the utterance is not related to the search (NO in Step 110), the interactive input/output in Step 100 is repeated.

In Step 120, a keyword and an attribute (ATB) value are extracted. In Step 130, a past inquiry is retrieved. The processes are performed by the vector retrieval/generation/correction unit 34. The process in Step 130 is based on the inquiry history 36.

In Step 140, whether the search is to be executed or not is determined. When it is determined that the search is to be executed (YES in Step 140), the program advances to Step 150. On the other hand, when it is not determined that the search is to be executed (NO in Step 140), the processes from Step 100 are repeated.

In Step 150, the vector profile 35 is selected. In Step 160, the dimensional composition of an inquiry vector is determined. In Step 170, a vector table is referred to. In Step 180, an initial inquiry vector is generated. The processes are performed by the vector retrieval/generation/correction unit 34.

After that, the program moves to Step 190 in FIG. 4. In the subsequent processes, the initial inquiry vector is expanded and corrected.

In Step 190, the user profile 38 is referred to. In Step 200, a process result of the user model 37 is referred to. Further, in Step 210, an inquiry matrix is referred to. In Step 220, the initial inquiry vector is expanded and corrected.

The outline of the inquiry generating process has been described above. In order to deepen understanding of the processes, characteristic processes will be concretely described one by one.

<1>-1 Inquiry Vector

An inquiry vector is constructed by a dependence vector and an attribute vector.

The dependence vector is disclosed in Japanese Patent Application No. 2001-1365 and is obtained by converting a user request into a numerical form indicative of dependence on each of various items. That is, by introducing the concept of a dependence vector, a user request can be expressed quantitatively. It produces an enormous effect on information of an attribute which is difficult to be directly converted to numerical form.

In the attribute vector, an attribute value of each of various attributes indicative of features of the contents is described.

For example, as the attributes of the contents of a restaurant, the following attributes may be prepared.

| | |
|---|---|
| <emergency> | 9 |
| <degree of family-orientation> | 4 |
| <popularity> | 8 |
| <price> | 5 |

Numerical values on the right side are an example of the attribute values. By digitizing such attributes as attribute vectors, the features of the contents can be reflected in distance of vectors, and a search can be conducted based on the vectors.

<1>-2 Generation of Initial Value of Inquiry Vector

As described above, the inquiry vector is constructed by the attribute vector and the dependence vector. Therefore, the components of the inquiry vector are the attribute value and the dependence value.

It will be repeated that the attribute value is obtained by expressing concrete attributes of requested contents (for example, the degree of family-orientation, popularity, price, neatness, the number of seats, and so on) in numerical form. Dependence is the degree of interest in various attributes of the contents.

<1>-2-(1) Determination of Dimensional Composition (Step 160 in FIG. 3)

In order to generate the inquiry vector, a space for constructing the inquiry vector has to be defined.

Methods of defining the space include reference to a default space and reference to a vector attribute base table. The vector attribute base table is read as the vector profile 35 (Step 150).

<1>-2-(1)-[1] Reference to Default Space

The space of the inquiry vector is defined by combining attribute dimensions of the highest use frequency in an information-retrieval task as an object.

For example, as shown in the lower part of FIG. 5, a default space is constructed by using total eight representative dependence attributes. In FIG. 5, attributes 1 to 8 are defined as follows.

attribute 1: dependence on place of scene
attribute 2: dependence on time of scene
attribute 3: dependence on actor of scene
attribute 4: dependence on genre of scene
attribute 5: dependence on weather of scene
attribute 6: dependence on size of contents
attribute 7: dependence on coding method
attribute 8: dependence on cost of contents In this case, the attributes do not have a relation of orders. Consequently, the order of the component of the attribute in an actual vector can be arbitrarily selected.

<1>-2-(1)-[2] Reference to Vector Attribute Base Table (Step 150 in FIG. 3)

With reference to the vector attribute base table as the vector profile 35, the space of the inquiry vector is defined by combining related attribute dimensions. It corresponds to an operation of classifying vectors by types and profiling related attributes. The vector attribute base table is as shown in FIG. 6.

For example, with respect to a mobile profile in FIG. 6, "dependence on time of user," "dependence on place of user," and "dependence attribute" are checked and selected as attribute bases. The dependence attributes can be developed as total eight attributes as described above.

attribute 1: dependence on time of user
attribute 2: dependence on place of user
attribute 3: dependence on place of scene
attribute 4: dependence on time of scene
attribute 5: dependence on actor of scene
attribute 6: dependence on genre of scene
attribute 7: dependence on weather of scene
attribute 8: dependence on size of contents
attribute 9: dependence on coding method
attribute 10: dependence on cost of contents As described above, a predetermined representative space will be called a "default space," and a space obtained by using the vector attribute base table from the vector profile 35 will be called a "profile space."

It may be considered that an attribute dimension is added to such a default space or profile space in accordance with an application or the like. The space to which the attribute dimension is added will be called an "option space."

In the following description, the default space defined by the total eight attributes (dimensions) will be used as a concrete example and described as a "representative space."

<1>-2-(2) Determination of Attribute Value

Determination of the attribute value is, that is, generation of the initial inquiry vector (S180 in FIG. 3). An attribute value is determined on the basis of keyword input, interactive process, the user profile 38, and the like.

<1>-2-(2)-[1] Generation from Keyword Input

In this case, by referring to the representative vector value correspondence table as shown in FIG. 5, an initial vector is generated from a keyword.

For example, a vector (Splace, Stime, Actor, Genre, Weather, Csize, CodSch, and Cost) of the representative space is generated.

Splace: dependence on place of scene
Stime: dependence on time of scene
Actor: dependence on actor
Genre: dependence on genre
Weather: dependence on current weather
Csize: dependence on size of contents
CodSch: dependence on coding method
Cost: dependence on cost If the representative vector value correspondence table shown in FIG. 5 is used at this time, a keyword and the vector can be associated with each other. For example, each of "traffic jam state," "congestion," "sightseeing" and "video mail, TV phone" is associated with a vector as follows.

| | |
|---|---|
| traffic jam state: | FF03E6FA |
| congestion: | FC0806F0 |
| sightseeing: | F80E46F0 |
| video mail, TV phone: | 1AF506A0 |

Each attribute value is expressed in hexadecimal notation of hexadecimal digits from "0" to "F." A vector obtained in association with a keyword will be called a "representative vector."

Naturally, the same representative vector is obtained in association with the same keyword. A correcting process of further generating a vector according to an information retrieval, which will be described later, is consequently performed.

When the representative vector value correspondence table is used, in some cases, a plurality of representative vectors correspond to an input keyword group.

In this case, as a method, it is sufficient to calculate an average value of representative vectors corresponding to each keyword and use the average value as a representative vector as shown by the following equation.

$$v_{kW}=(1/N)\Sigma v(kW_i)$$

where $v(kW_i)$ indicates a representative vector corresponding to a keyword $kW_i$, and $\Sigma$ denotes the symbol of the sum of i=1 to N.

<1>-2-(2)-[2] Generation from Interaction

Generation from interaction will now be described. Generation from interaction includes generation from utterance of the user and generation of an interaction scenario.

A vector is generated from utterance of the user on the basis of a keyword in the utterance of the user. When a keyword in the utterance of the user is obtained, a representative vector can be specified by using the representative vector correspondence table. In the case of using the representative vector correspondence table, synonyms may be also considered.

Further, in the case of a keyword which is not included in the representative vector correspondence table, a request is estimated and associated with a keyword.

For example, a case where the following keywords are included in user utterance will be considered.

| | |
|---|---|
| requesting words: | I want to eat, I want to see |
| name of dish: | Sukiyaki, Chinese noodles |
| place name: | near Nagoya station |
| name of person: | Prince Shotoku, Mr. Robot, Mr. Koizumi |

In this case, attribute values are determined as follows.

"I want to eat" (requesting words), "Chinese noodles" (name of dish) and the like are associated with a request for a meal. Therefore, a keyword "restaurant retrieval" can be selected.

When the name of place is in a keyword, dependence on place can be extracted, dependence on place in a representative space can be estimated, and a vector "FXXXXXXX" can be associated.

In the case where the name of a person is in a keyword, dependence on actor can be extracted, dependence on attribute in the representative space can be estimated, and a vector "XXFXXXXX" can be associated.

It is desirable to employ a system capable of understanding a context having a certain length. Otherwise, in the case where the name of a person plays the role of "calling" in a sentence, the name of the person cannot be regarded as a search keyword. For example, "Mr. Robot" in utterance such as "Mr, Robot, tell me a parking place" is calling, not a search keyword.

In consideration of the above, a search keyword is generated on the basis of a sentence pattern, a request word, intention of utterance of the user, and the like.

There are various sentence patterns of user utterance as follows even without expressions of polite language and honorific words. The sentences are related to, not only the nature of an inquiry but also subtle nuance in utterance as follows.

| | |
|---|---|
| What can you do? | <question> |
| It's hot, isn't it? | <greeting, seeking agreement> |
| Why . . . ? | <asking for a reason> |
| Can you tell me how to use a car audio? | <request> |
| I'd like to have a meal. | <transmission of desire> |
| Search a restaurant. | <instruction> |
| Is there any mail? | <check, question> |

In each of those cases, from the sentence pattern shown on the left side, nuance, intention, and the like of utterance shown on the right side can be extracted.

Requesting words include the following.

{I want to see, I want to eat, I want to go, I want to know}

The requesting words provide most dominant information at the time of generating an inquiry vector. However, there is a case that the requesting words are used also in different tasks, so that it is often necessary to recognize the object word in order to generate an accurate inquiry vector. When the conditions as the background of an inquiry can be estimated by the user profile 38 or user model 37, an inquiry vector can be generated under vague conditions where there is no object word.

For example, in the case of "show me news," it is important to recognize the object word of "news" in order to determine a task. On the other hand, in the case of "show me Sakura-cho intersection," the possibility that the task is a traffic jam search task is high.

In the case where the intention of utterance can be estimated, an inquiry vector may be generated on the basis of the intention of utterance. As described above, there is a case that the intention of utterance can be estimated from a sentence pattern. It can be also estimated from other information.

On the other hand, an inquiry vector can be also generated from an interactive scenario.

In sound interaction of which task is determined, an agent can estimate interactive state with the user and the intention of utterance of the user at the present time point from an interactive scenario used. By using the task, interactive state, and the intention of utterance, an inquiry vector can be generated.

<1>-2-(2)-[3] Generation from User Profile 38

Generation of an inquiry vector from the user profile 38 will now be described. For example, Japanese Patent Application No. 2000-285521 discloses a technique of estimating dynamic data of environment, conditions, request, state, action, aspect, and the like of the user on the basis of a user model and a request estimating method.

On the basis of such user information, an inquiry vector matching the user request can be estimated. Although there is a case that the estimating process includes interaction, an inquiry can be automatically generated without interaction. For example, when there is a profile as described below, an inquiry vector for searching for a gasoline stand near the present position is generated.

Information in vehicle profile

<The remaining quantity of gasoline>=3 liters

Information in user profile

<distance to the destination>=100 km

<present place>=suburb of Asahikawa-shi, Hokkaido

<time>=8 pm, weekday

Further, when interaction is provided together with the profile information, an inquiry vector can be compensated with respect to a vague request. For example, when the user utters as follows, by using the information in the user profile, places estimated to be jammed in a path to the destination are checked and an inquiry including an inquiry vector FF03E6FA for retrieving traffic jam information and inquiry attribute values (time and place) is generated.

user utterance

"Is the road ahead congested?"

information in user profile

<present location>=Kamishigeharachou, Chiryuu-shi, Aichi-prefecture

<destination>=head office (1-chome, Showa-cho, Kariya-shi, Aichi-prefecture)

<requests>=retrieval of traffic jam information, display of video images

<driving conditions>=stopping at a red light at an intersection

<1>-3 Correction of Vector (S220 in FIG. 4)

<1>-3-(1) Reference to History

A past inquiry is obtained by searching the inquiry history 36 (Step 130). An inquiry vector in the inquiry history 36 is used for comparison. An evaluation function can be defined as, for example, a distance as follows.

L=Lvector+Lptime+Lcplace

Lvector=dist(vinit, vpast)

where reference characters denote as follows.

Vinit: initial inquiry vector

Vpast: past inquiry vector dist(A,B): distance between vectors A and B, such as Euclidean distance, absolute distance, and the like.

Lptime: time difference, as a distance, between present time and time at which Vpast is stored within a range of a certain period (for example, one year)

Lcplace: distance with respect to a category of place

L is calculated with respect to a past vector to be retrieved and a past representative vector is selected by, for example, the following method.

(Method 1) To select Vpast which minimizes L (Method 2) To average all of past inquiry vectors of which L is equal to or smaller than a predetermined threshold value The concept of a distance is to consider time dependence and place dependence. Attention is paid to the fact that the request of a user has periodicity of, for example, one year, one month, one week, or one day, and an inquiry vector is selected by introducing not only the distance between vectors but also distance with time. It is similarly applied to places. For example, distances to places in categories such as rest places such as parks and seaside and meal places such as restaurants and tea rooms.

<1>-3-(2) Use of the User Model 37 (Step 200 in FIG. 4)

In Japanese Patent Application No. 2000-285521, time, space, conditions, and the like are modeled as a user model. The user terminal 3 of the embodiment has the user model 37. By processing background information with the user model 37, the meaning of an inquiry can be estimated. That is, an initial vector generated as a typical representative value is evaluated by the user model 37 as another viewpoint.

<1>-3-(3) Reference to the User Profile 38 (Step 190 in FIG. 4)

The inquiry vector is modified with reference to user taste information stored in the user profile 38, thereby enabling a weighting value regarding a dominant attribute dimension of the inquiry vector to be corrected.

It is assumed that the initial inquiry vector is given in a representative space. For example, it is assumed that a vector (SPlace, Stime, Actor, Genre, Weather, Csize, CodSch, Cost)=(FF03E6FA) is an initial vector. In the case where a terminal environment used is a high-performance terminal, conditions peculiar to the user such that the vector does not depend so much on the contents size, coding method, and contents cost are estimated from the user profile 38. Consequently, it is considered to suppress the attribute values of Csize as the size of the contents, CodSch as the coding method, and Cost as the contents cost. For example, the corrected inquiry vector is obtained as FF03E342.

As described above, vector correcting methods include the method of using a past inquiry vector, the method of using the user profile, and the method of using user taste information. By storing an inquiry matrix which will be described later, an inquiry vector can be corrected by the inquiry matrix.

<1>-4 Inquiry Profile

<1>-4-(1) Configuration of Inquiry Profile

An inquiry profile is constructed by a search keyword and an inquiry vector. The search keyword indicates an item group used for search.

For example, for a keyword "travel information," the following item group is prepared.

<destination>
<period of trip>
<place of hotel>
<accommodation charges>
<the number of guests>
<sightseeing spots>
<map information of the area and surrounding area>
<restaurants in and around the area>
<transportation means>

It is considered that items added to the group of items are employed as search keywords. In the case where a set of such item groups is prepared, the final goal in a search may be determination/acquisition of an item which is not added.

<1>-4-(2) Generation of Inquiry Profile

Figure 7:
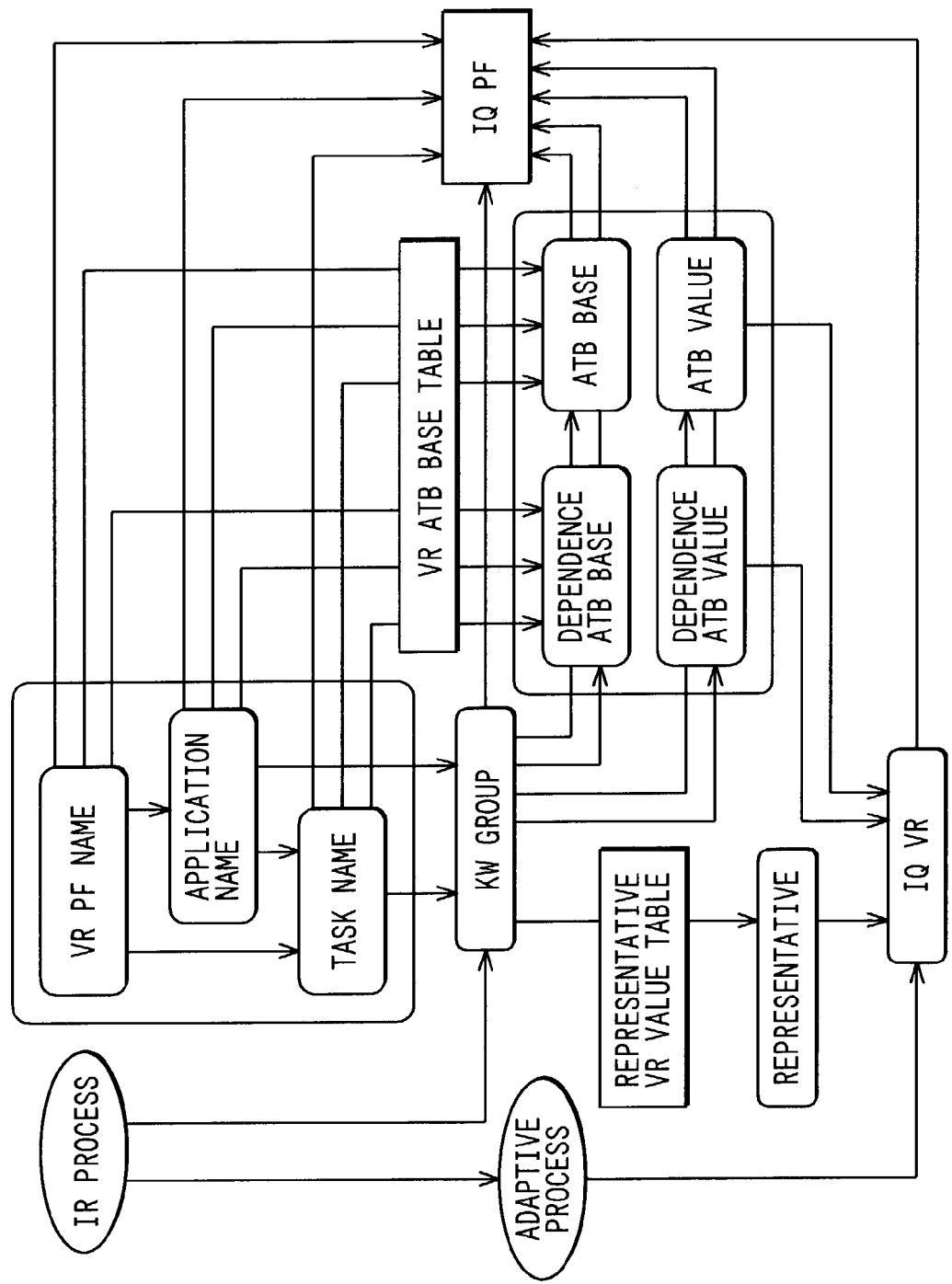
FIG. 7 is an explanatory diagram showing assembly of information to an inquiry profile.

Generation of an inquiry profile denotes generation of a search keyword and an inquiry vector as described above. FIG. 7 is an explanatory diagram showing assembly of information into an inquiry profile.

In the embodiment, from the viewpoint of a smoother information retrieval, information is assembled into an inquiry profile on the basis of the following system processes.

The system processes are an interactive process and an adaptive process.

The interactive process is realized mainly by the interactive control unit 33 via the external input/output interface 31. By the interactive process, a keyword group necessary for a search is obtained from the outside.

The adaptive process is an adaptive process for a user (including the characteristics of an individual, interactive state, and the like), a terminal, a system, a network, contents, and the like. Particularly, the adaptive process driven in the interactive process relates to the generation of the inquiry vector.

By using the interactive process and the adaptive process as a trigger, information transformation as follows is performed.

association between keyword and attribute base
association among profile name, application name, and task name
association between profile name and attribute base
association between application name and attribute base
association between task name and attribute base
association between keyword and representative value of inquiry vector It has been already described that the vector profile 35 refers to the vector attribute base table. Although the terms "profile," "application," and "task" have been used, a set of the tasks is called an application, and a group of the applications and tasks is called a profile. The terms are concepts of layering the functions of the user terminal 3, and the use states of the user terminal 3 are expressed in the layering concept of the profile, application, and task.

In the vector profile 35, a mobile profile, an in-vehicle profile, an office profile, an edition profile, a home profile, and the like can be prepared. In the application, restaurant retrieval, traffic jam information retrieval, skiing ground retrieval, and the like can be prepared. Similarly, in the task, weather information retrieval, news retrieval, Internet search, and the like can be prepared. They correspond to class names in the vector attribute base table shown in FIG. 6.

The keyword group is obtained not by the interactive process but also from the profile, application and task.

<1>-5 Storage of Inquiry Vector (Inquiry History 36)

The inquiry vector or inquiry profile is stored as the inquiry history 36 in the user terminal 3. As described above, desirably, the inquiry vector or inquiry profile is stored as information for correcting the initial inquiry vector.

<1>-5-(1) Storing in Time and Space Model

By storing the inquiry vector on the basis of a time and space model, a vague retrieval as described below can be conducted. Specifically, an inquiry vector is stored in the form of an inquiry profile obtained by adding keywords of time and place to the inquiry vector.

For example, the case where the following inquiry is made will be described.

<Inquiry>
user utterance: "Is the road from the Nakatugawa IC congested?"
time: 7:30, Apr. 1, 2001 (Sun)
place: near Ena IC of Chuo highway
situations: moving to skiing ground
<inquiry profile>
dependence vector: time, place, object, cost
attribute value vector: time=7:30, Apr. 1, 2001 (Sun)

place: near the exist of Nakatsugawa IC of Chuo highway
object: traffic jam retrieval
<result of retrieval>
system utterance: "the road is not congested so much in this time zone in Sunday"
video retrieval result: video image of the place near the exist of Nakatsugawa IC at 7:10

By storing the inquiry profile in such a case, for example, when a similar inquiry is made after one year, a proper inquiry vector can be generated.

<Inquiry>
user utterance: "How about traffic jam after Nakatsugawa?"
time: 7:30 on Apr. 7, 2002 (Sun)
place: near Ena IC of Chuo highway
situation: moving to a skiing ground Specifically, when time, place, situation, and the like are similar to the above, the inquiry vector of about one year ago is retrieved and, on the basis of the inquiry vector, a proper initial inquiry vector can be corrected. By storing the inquiry profile so that a retrieval result is included, without requesting a retrieval to the information center 5, a proper result can be notified to the user only by the user terminal 3.

<1>-5-(2) Definition of Vector Type of Inquiry Vector

It has been already described that the attribute bases of the inquiry vector is dynamically determined. Since the attribute bases of the inquiry vector are not fixed, a flexible search can be conducted.

At this time, the attribute base and the attribute value can be described so as to correspond to each other in the inquiry profile. In this case, however, the information amount of the inquiry profile becomes large.

In the embodiment, therefore, an identifier expressing a vector type is set for a relatively often used search application, for example, each of applications such as traffic jam retrieval, restaurant retrieval, travel information retrieval, mobile information retrieval and the like as follows.

<Vector Type><Vector Value>
=traffic jam retrieval, FF03E6FA

Although a keyword in the representative vector value correspondence table is employed as a vector type, the vector type which is not the keyword may be also defined.

That is, the configuration of the attribute bases of the vector is divided into vector types.

In such a manner, it is unnecessary to designate the attribute bases each time in an inquiry profile. That is, an information amount of the inquiry profile can be reduced. Therefore, it is advantageous for storage of the inquiry profile. Also in a retrieving process which will be described later, the vector type can be determined and a retrieval can be conducted.

<1>-5-(3) Time Periodicity and Space Similarity

It has been already described that, by storing an inquiry vector in the form of an inquiry profile together with time, place, situation, and the like, an effect of correcting the initial inquiry vector for a vague inquiry becomes extremely large.

In the example, however, time and place are employed as a point in a so-called time and space. The following method can be accordingly used.

Japanese Patent Application No. 2000-285521 discloses a method of quantifying time periodicity and space similarity. In the time periodicity, attention is paid to the fact that a request of the user has periodicity of one year, one month, one week, one day, or the like. In the space similarity, attention is paid to similarity which is found when the place of the user is classified into a plurality of categories.

On the basis of the time periodicity and space similarity, an inquiry vector is stored with respect to not only coordinate values (in time and space), a time index and a space category in one-year cycle.

For example, an inquiry profile is stored in address description of "around noon on Sunday, park." A storage space based on the time index and space category will be called a "time and space memory."

Figure 8:
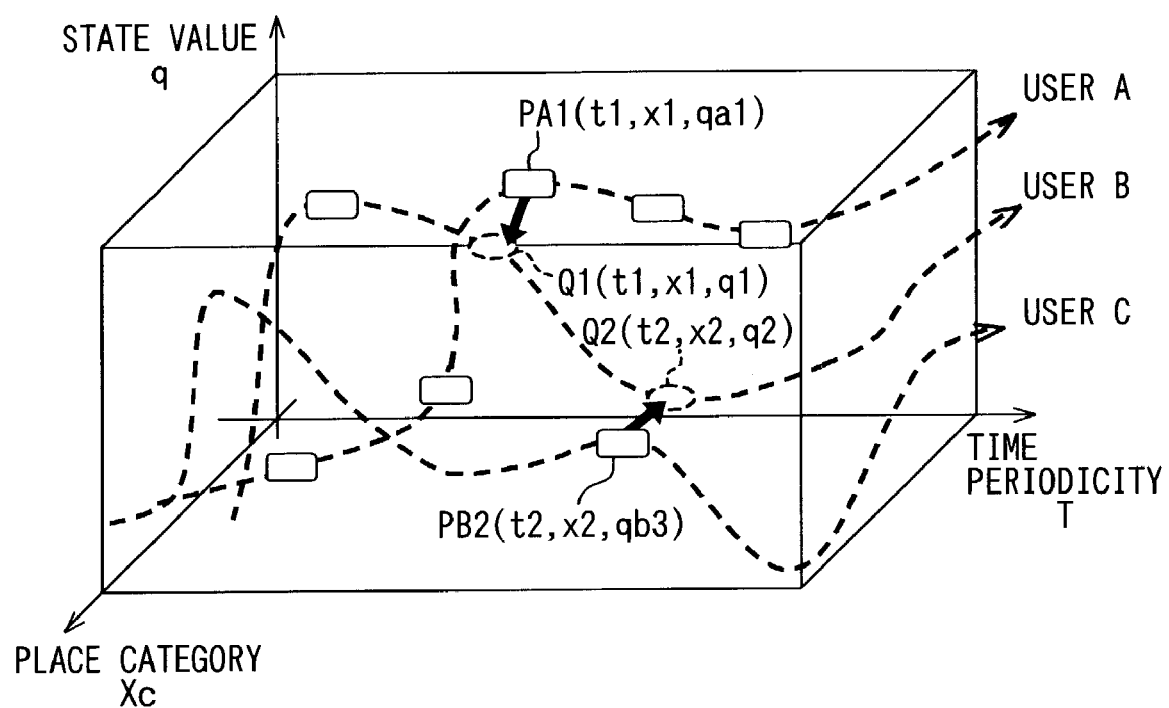
FIG. 8 is an explanatory diagram showing correction of an inquiry vector by using a user's locus.

In the time and space memory, a vector and a locus of the user are allowed to exist as shown in FIG. 8.

By using a distance on the time and space memory, the similarity of inquiry vectors based on a user behavior pattern can be determined.

In such a time and space memory, as shown in FIG. 8, inquiry profiles of a plurality of users A, B, and C may be stored on loci of the users A, B, and C, respectively. By referring to an inquiry profile of another user, a user request based on vague utterance can be estimated more accurately.

For example, FIG. 8 shows inquiry profiles such that rectangles shown on the loci are stored. For an inquiry Q1 of the user B, an inquiry profile PA1 of the user A can be used. For an inquiry Q2 of the user B, an inquiry profile PB2 of the user C can be used.

By introducing the concept of periodicity of time, an unknown attribute of the present user can be interpolated by using history of another user. Consequently, proper correction of an inquiry vector on the basis of the inquiry history 36 can be achieved.

A concrete example of the storage form of user history will now be described.

A tag (auxiliary information) is attached to user utterance obtained in sound interaction with the user and the result is stored in the time and space memory.

It is sufficient to store it, for example, in the form of "utterance of the user" (user name, time, place, object of action, object of inquiry, and inquiry vector). The data in the parenthesis corresponds to a tag in this case. A user profile (or a pointer to the user profile) or a dependence vector can be used as the tag.

"supermarket nearby" (Hanako, Jan. 1, 2001, Ichinomiya, ski, surrounding-area search, FC809AB5)

"convenience store nearby" (Taro, Mar. 15, 2001, Nakatsugawa IC, ski, surrounding-area search, FC809392)

"flower viewing" ("X," Apr. 1, 2001, parking at home, outing, flower viewing search, BDA00276)

"pharmacy nearby" ("X," Aug. 12, 1998, Kiyosato, Yamanashi-Prefecture, trip, surrounding-area search, F5903395)

"restaurant near the exit of highway" ("X," Aug. 12, 1998, 12:30, Suwa IC, trip, surrounding-area search, F5903D95)

"events of today" (Taro, Sep. 15, 2001, in front of Mei station, shopping, event search, F590F395)

"entrance of highway" (Jiro, Oct. 3, 2000, Nagoya IC, concert, traffic jam search, FF903305)

"result of baseball game" (Taro, Nov. 1, 2001, 22:10, Nisshin-shi, on his way home, news search, FD9D3305)

"not-congested road" ("X," Nov. 10, 2001, Korankei, outing, traffic jam search, FFF03395)

"restaurant which serves tasty fired pork cutlet in Kariya" ("X," Oct. 20, 1999, 12:00, Chiryuu-shi, tennis, restaurant search, 7590FF95)

<1>-5-(4) Inquiry Matrix

Considering storage of an inquiry vector into such a time and space memory, a plurality of vectors may be stored in the same time and space range. For example, in a certain time and space range, inquiry vectors based on inquires such as "Where is a restaurant?," "What is today's event?," and "Is there any shopping center nearby?" are stored.

Although it is not impossible that one user makes a plurality of inquiries at the same time, such a case is rare. In other words, when an inquiry is clear, it is unnecessary to consider a plurality of inquiry vectors in the time and space range. On the other hand, on the basis of a plurality of inquiry vectors, the contents of an inquiry of the user can be predicated from information in the time and space range. That is, it can be considered that the user moves on a time and space locus always with a plurality of different kinds of inquiry vectors. The inquiry vector in this case depends on the time and space address.

It is therefore effective to store a set of inquiry vectors in the time and space memory. A set of inquiry vectors is an "inquiry matrix."

By referring to such an inquiry matrix (Step 210 in FIG. 4), an inquiry can be predicted and an inquiry vector can be properly corrected.

<1>-6 Method of Optimizing Inquiry Vector

A method of optimizing an inquiry vector on precondition of a search process will be briefly described. The idea is common to a feature vector which will be described later and will be described specifically as explanation of a feature vector.

<1>-6-(1) Multiply Inquiry Vector by Scalar of Representative Feature Vector

When a feature vector group can be classified into representative classes of, for example, traffic jam information, restaurant information, and the like, an inquiry Qi corresponding to a class CLi can be preliminarily multiplied by a scalar of a representative vector Ci as follows.

$$Qi = K\ Ci$$

In such a manner, a contents evaluation value becomes the maximum when K is constant. That is, contents in CLi are retrieved with reliability. In this case, however, if the number of contents in CLi is enormous, a devise of narrowing retrieval candidates becomes necessary.

<1>-6-(2) Expand Dimension of Inquiry Vector

When a number of contents as candidates exist, the dimension of an inquiry vector is expanded to select more optimum contents from a candidate group, and an optimum contents group is selected for the expanded part vector.

<2>Information Center 5

The information center 5 is characterized by generation of a feature vector indicative of a feature of contents and, further, a search using an inquiry vector from the user terminal 3.

<2-1>Generation of Feature Vector

Figure 9:
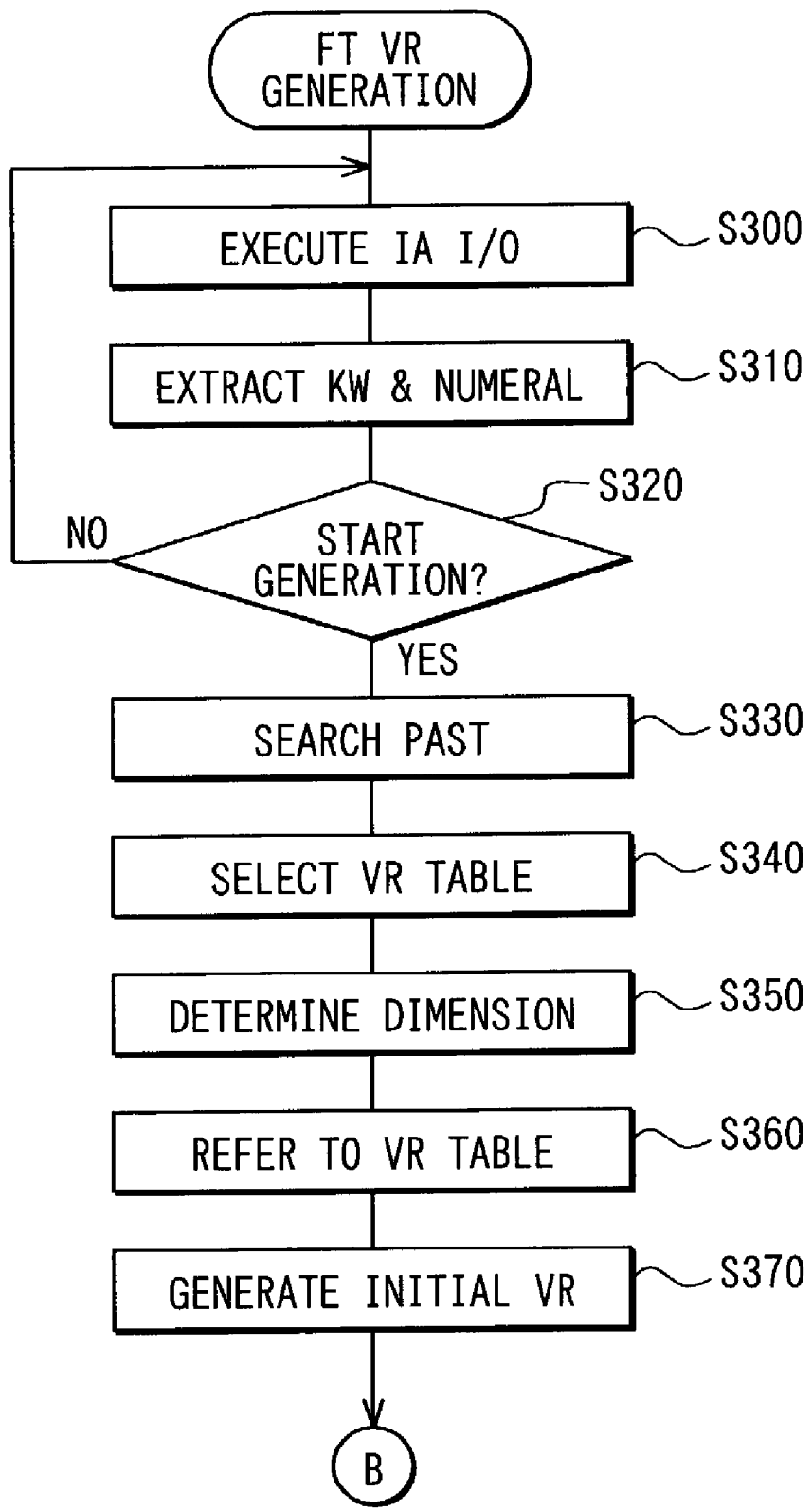
FIG. 9 is a flowchart showing an earlier portion of a feature vector generating process.
Figure 10:
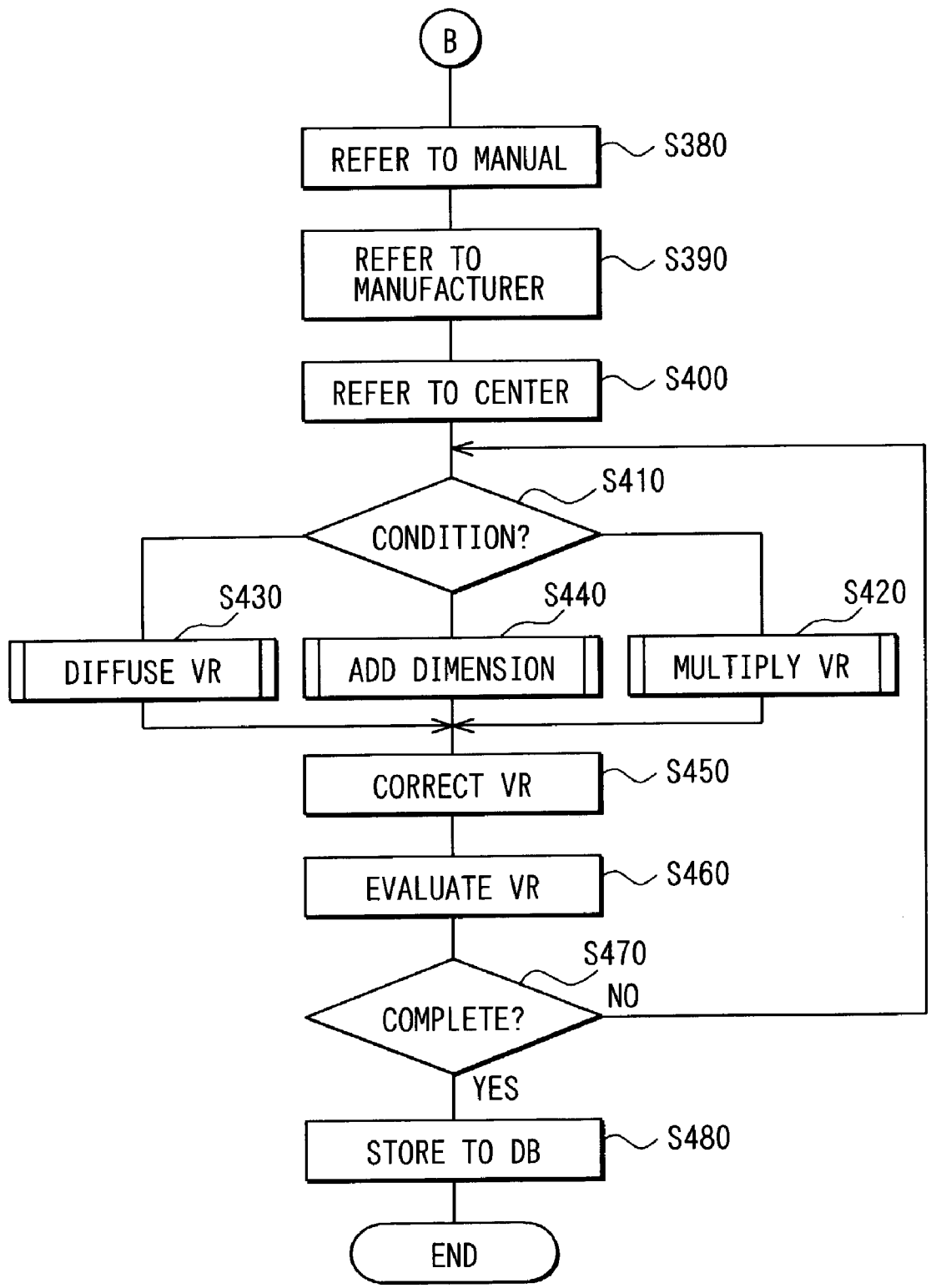
FIG. 10 is a flowchart showing a later portion of the feature vector generating process.

FIGS. 9 and 10 are flowcharts showing a feature vector generating process executed by the information center 5.

In the first Step 300, interactive input/output is performed. The process is performed by the contents management and retrieval control unit 53 via the external input/output interface 51. In Step 310, a keyword and a numerical value are extracted. In Step 320, whether generation of a feature vector is started or not is determined. When it is determined that generation is started (YES in Step 320), the program advances to Step 330. On the other hand, when it is determined that generation is not started (NO in Step 320), the processes from Step 300 are repeated.

In Step 330, a past feature vector is retrieved. A past feature vector is retrieved from the feature vector database 57. In Step 340, the vector table 55 is selected. In Step 350, the dimensional composition is determined. In Step 360, a vector table is referred to. In Step 370, an initial feature vector is generated. The series of processes is executed by the vector retrieval/generation/correction unit 54.

The program advances to Step 380 in FIG. 10, in the subsequent processes, the initial feature vector is expanded and corrected.

In Step 380, a manual operation is referred to. In Step 390, manufacturer information is referred to. Further, in Step 400, center information is referred to.

In Step 410, conditional branch is performed and a feature vector is optimized by various methods. In Step 450, the feature vector is expanded and corrected. The conditional branch is performed on the basis of a predetermined condition. For example, the processes from Step 410 are repeated in the case where feature vector expansion/correction is not completed. Based on the number of repetition times, the process may be branched.

Methods of optimizing a feature vector includes multiplication of a vector by a scalar (Step 420), diffusion of a vector (Step 430), and addition of a new dimension (Step 440) which will be described later.

In Step 460, a feature vector is compared and evaluated. In Step 470, whether expansion/correction on the feature vector has been completed or not is determined. When it is determined that the expansion/correction is completed (YES in Step 470), the program advances to Step 480. On the other hand, when the expansion/correction is not completed (NO in Step 470), the processes from Step 410 are repeated.

In Step 480, the feature vector is stored in the feature vector database 57 and, after that, the feature vector generating process is finished.

The outline of the feature vector generating process has been described above. In order to deepen understanding of the processes, characteristic processes will be described concretely one by one.

In the contents database 61 of the information center 5, various contents to be retrieved are stored. For retrieval of contents stored in the contents database 61, a feature vector associated with the contents is stored in the feature vector database 57. By preparing the feature vectors, evaluation on contents by the inquire vector is made possible. For example, an evaluation value of contents can be defined as an inner product between an inquiry vector and a feature vector.

<2-1>-1 Feature Vector

Since a feature vector is used to evaluate contents in relation with an inquiry vector as described above, it is defined by attribute bases and attribute values in a manner similar to an inquiry vector. Since the attribute bases are dynamically determined, the feature vector has to be corrected/expanded from the viewpoint of matching with an inquiry vector.

<2-1>-2 Generation of Initial Value of Feature Vector (Step 370 in FIG. 9)

To some contents, a feature vector is preliminarily given. In this case, therefore, the feature vector is used as it is as an initial value.

With respect to contents to which a feature vector is not given, a manner similar to the case of an inquiry vector is executed. On the basis of a keyword input (Step 310 in FIG. 9), the vector table 55 is selected to determine a dimensional composition (Step 340 and Step 350), and by referring to a vector table a representative vector is obtained (Step 360 and Step 370).

FIG. 11 shows a state where the title of a video image, attribute of the video image, category, and feature vector are associated with each other and defined on precondition of a dimensional composition corresponding to the representative space which has been explained in the description of the inquiry vector.

In this case as well, a representative vector can be specified as a feature vector from a keyword. The keyword may be input from the user via the external input/output interface 51 of the information center 5. A keyword may be extracted from metadata accompanying contents. In the case of using the metadata, an attribute value of a feature vector can be specified from the metadata.

The vector table 55 corresponds to the vector profile 35 of the user terminal 3. That is, it is used to determine a dimensional composition. A set of representative attribute bases may be prepared as a default space. The former corresponds to the profile space and the latter corresponds to the default space in the case of an inquiry vector. Similarly, the dimension can be also expanded. This corresponds to the option space in the case of an inquiry vector.

That is, in a manner similar to the inquiry vector, also in the feature vector of the contents, a profile as the vector table 55 according to an application can be defined. In the same profile, in principle, definition of the dimension of the inquiry vector and that of the feature vector have to coincide with each other. In the case where they do not coincide with each other, a vector is expanded as described later. A plurality of vector tables can be applied to the same contents. In this case, therefore, the same contents have a plurality of feature vectors.

Considering that an inquiry vector is dynamic, the attribute bases of a feature vector are also made variable in the embodiment. Consequently, a concept of addition of a dimension can be introduced and the feature vector can be properly compared with the inquiry vector.

In the embodiment, particularly, the attribute bases of a feature vector are constructed by a general dimension and an individual dimension as described below.

In the general dimension, general description regarding the contents is made. Standardization is needed to make a common feature vector interpreted by different terminals.

In the individual dimension, individual description regarding the contents is made. Any of standardized individual dimensions may be selected or an individual dimension may be newly generated in the information center 5. These mean expansion of the general dimension.

Further, a dimension is dynamically added. The dimension can be added in a manner similar to the addition of the option space of the inquiry vector. In the case where the metadata are stored in a read-only medium such as a DVD or a CD, additional description data has to be stored into a writable medium such as a hard disk.

<2-1>-3 Correction of Feature Vector (Step 450 in FIG. 10)

Also in a feature vector corresponding to contents, if an initial vector is used as it is, contents have the same feature vector in each category, so that a vector is overlapped and relevance of the vector deteriorates.

Therefore, a method of optimizing a feature vector is necessary. In the embodiment, the feature vector is optimized by methods as described below.

<2-1>-3-(1) Use of Information of Contents Producer (Step 390 in FIG. 10)

Producer information is information on the side of a producer of contents of video media, which is, for example, information such as time, place, producer, production cost, actor, and the like. The information is obtained by analyzing metadata of the contents or the like.

<2-1>-3-(2) Use of Center Information (Step 400 in FIG. 10)

Center information includes a search state, a state of access to contents, popularity of the contents, trend of other data, and the like. The center information can be referred to by storing the search history 56 in the information center 5.

<2-1>-3-(3) Use of Manual Operation (Step 380 in FIG. 10)

The embodiment is characterized in that, basically, a feature vector corresponding to contents is automatically generated by analyzing metadata or the like. Information can be also obtained by a manual operation so that the operator can give information individually.

<2-1>-3-(4) Introduction of Repulsion Between Vectors (Step 420 to Step 440 in FIG. 10)

Repulsion between vectors is to avoid overlapping of registered feature vectors by using the following methods. The methods include multiplication of a representative vector corresponding to a keyword by a scalar, expansion of a vector around the representative vector as a center, and addition of a new dimension.

<2-1>-3-(4)-[1] Multiplication of Vector by Scalar (Step 420 in FIG. 10)

Figure 12:
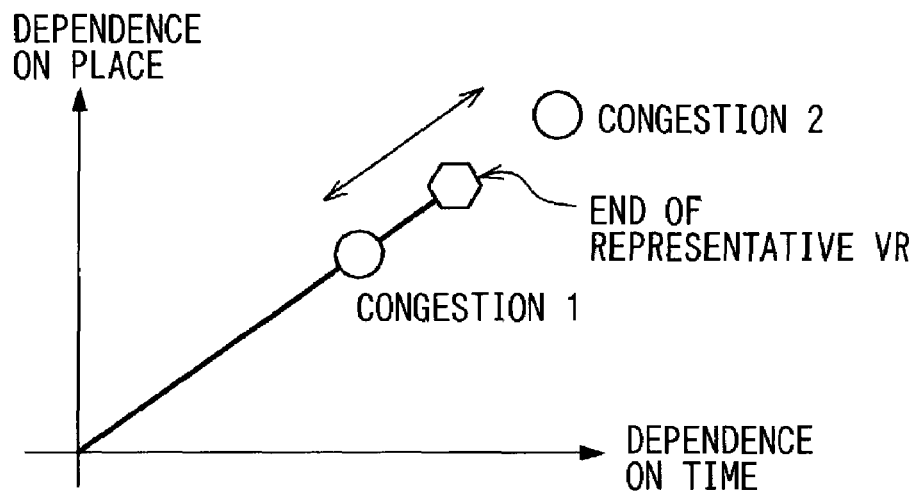
FIG. 12 is an explanatory diagram showing a scale change of a vector.

Multiplication by a scalar denotes a scale change. As shown in FIG. 12, it means a scale change in the direction of a representative vector as a feature vector as a center. A constraint may be added so that a barycentric vector in the scale-changed feature vector group coincides with the representative vector.

<2-1>-3-(4)-[2] Diffusion of Vector (Step 430 in FIG. 10)

Figure 13:
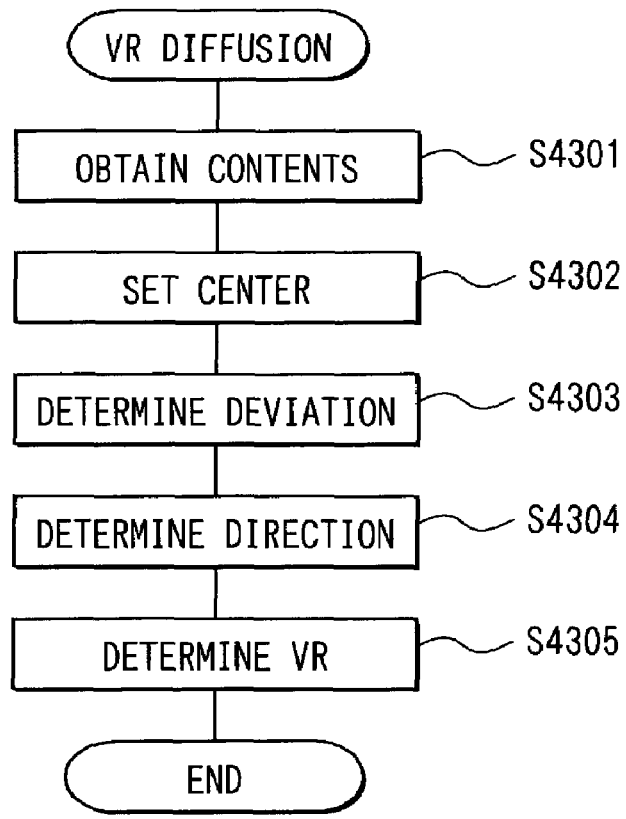
FIG. 13 is a flowchart showing a vector expanding process.

FIG. 13 is a flowchart showing a vector diffusing process.

Figure 14:
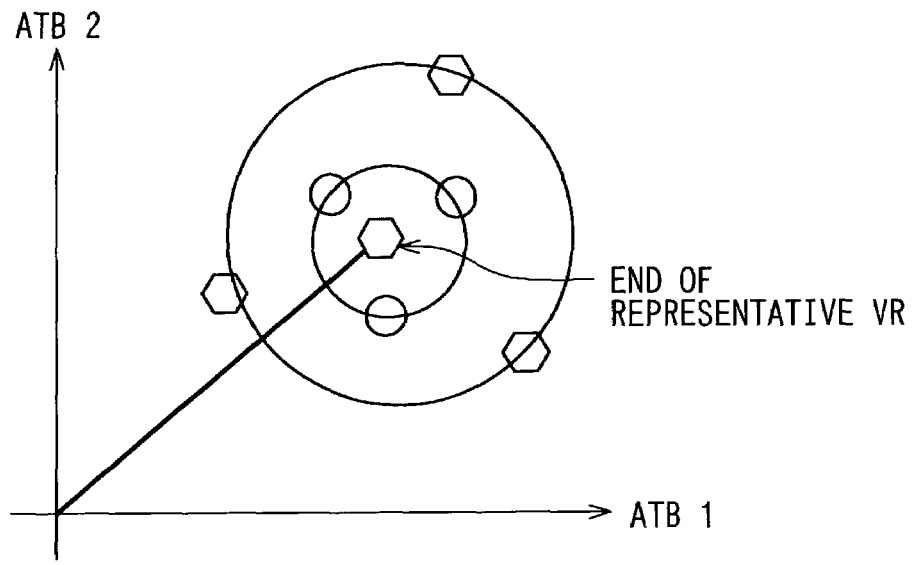
FIG. 14 is an explanatory diagram showing expansion of a vector.

When the process is started, new contents of the same keyword are obtained (Step 4301). The center of gravity is set in the representative vector of the keyword (Step 4302). After that, a deviation is determined (S4303), the direction is determined (Step 4304), and each of feature vectors is determined (Step 4305). As shown in FIG. 14, the operations can be explained as relocation so that the end point of a feature vector is positioned on a concentric circuit using the end point of the representative vector as a center. Generally, a feature vector is set so as to satisfy the following equation.

$$Vr(kw) = (1/N)\Sigma VCi(kw)$$

where, $Vr(kw)$ denotes a representative vector for a keyword kw, $VCi(kw)$ denotes a feature vector, and $\Sigma$ indicates a sum symbol of i=1 to N.

That is, the feature vector group corresponding to a keyword is disposed so that the barycenter vector always coincides with the representative vector of the keyword. By the operation, the vector group is spread and each of contents can be individually retrieved.

<2-1>-3-(4)-[3] Addition of New Dimension (Step 440 in FIG. 10)

Addition of the new dimension means that, when it is difficult to distinguish contents from each other in a vector space constructed by attribute bases of a feature vector defined with respect to a keyword, new attributes which make the contents distinguished from each other are added as new dimensions to the attribute bases.

Figure 15:
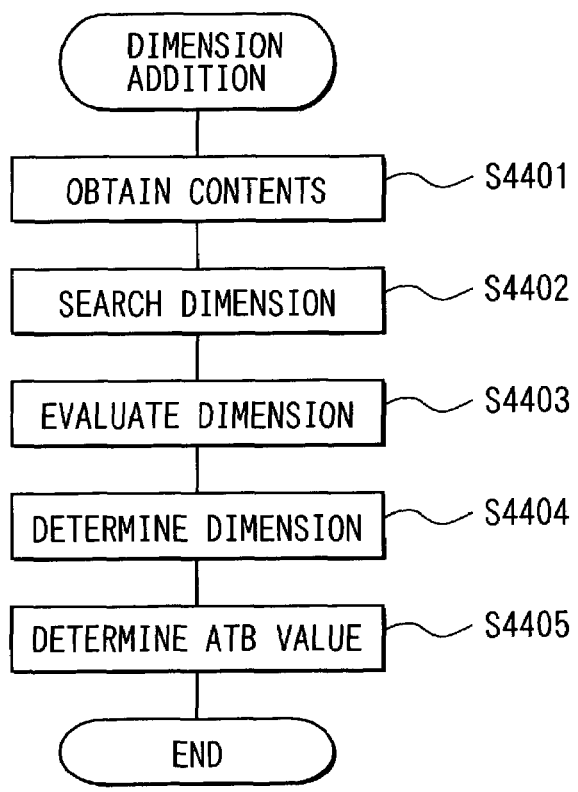
FIG. 15 is a flowchart showing a process of adding a new dimension to a vector.
Figure 16:
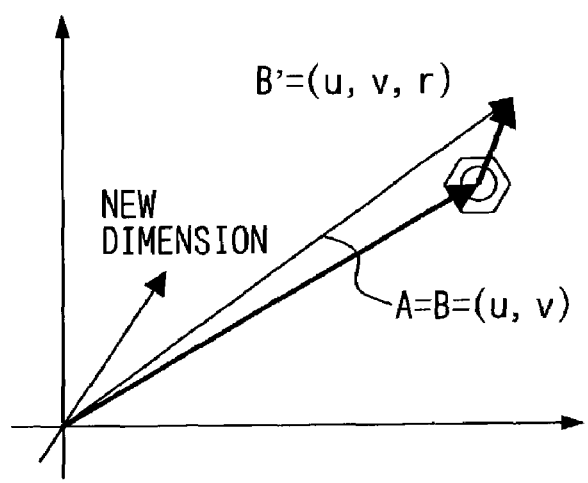
FIG. 16 is an explanatory diagram showing addition of a new dimension to a vector.

As shown in FIG. 15, when a process is started, new contents of the same keyword are obtained (Step 4401). After that, a new dimension candidate is retrieved (Step 4402). Based on a result of the retrieval, each dimension is evaluated (Step 4403), a new dimension is determined (Step 4404) and, finally, an attribute value of the new dimension is determined (Step 4405). An image of addition of a new dimension is as shown in FIG. 16.

It is assumed that feature vectors V1 and V2 have attribute values which cannot be distinguished from each other in correspondence with a keyword of "sightseeing information" under the attribute bases (Splace, Stime, Actor, Genre, Weather, Csize, CodSch, Cost) of a representative space.

V1=(F80E46F0)
V2=(F80E46F0)

"Uplace, Utime" are added as new attributes and, under the attribute dimension=(Utime, Uplace, Splace, Stime, Actor, Genre, Weather, Csize, CodSch, Cost), the feature vectors V1 and V2 are set as follows.

V1=(FFF80E46F0)
V2=(00F80E46F0)

Such attribute values may be set by an operator himself/ herself. However, by comparing contents retrieval histories with each other and extracting and setting different attributes with respect to the inquiry vectors, dependence vectors, and related keywords, attribute values can be automatically set. Consequently, the search history 56 of the information center 5 is stored in the form so that the inquiry profile and the search result correspond to each other.

In the example, "FF" is set for the feature vector V1 and "00" is set for the other feature vector V2 with respect to an added attribute dimension. Alternately, an undefined value or an average value may be set for the added attribute dimension.

<2-1>-4 Index of Optimization of Feature Vector

As indexes of optimization of a feature vector, the following can be considered.

<2-1>-4-(1) It is arranged so that the evaluation value of a feature vector of contents which are new in time is large for a representative inquiry. For example, with respect to traffic jam information, it is arranged so that an evaluation value of a feature vector of the latest video image is maximum.

<2-1>-4-(2) It is arranged so that an evaluation value of a feature vector of popular contents is large.

<2-1>-4-(3) It is arranged so that an evaluation value of target contents in a place in which a number of other contents are concentrated is preferentially large.

<2-1>-5 Storage of feature vector (Step 480 in FIG. 10)

Such feature vectors can be layered and stored in the feature vector database 57 in order to improve efficiency of a search which will be described later. For example, a feature space formed by feature vectors is layered and labeled. In such a manner, contents can be retrieved in a predetermined unit and a higher-speed search can be achieved.

The layering includes layering based on division of contents, layering based on division of a feature vector, and layering based on division of a feature vector space.

<2-1>-5-(1) Layering Based on Division of Contents

Figure 17:
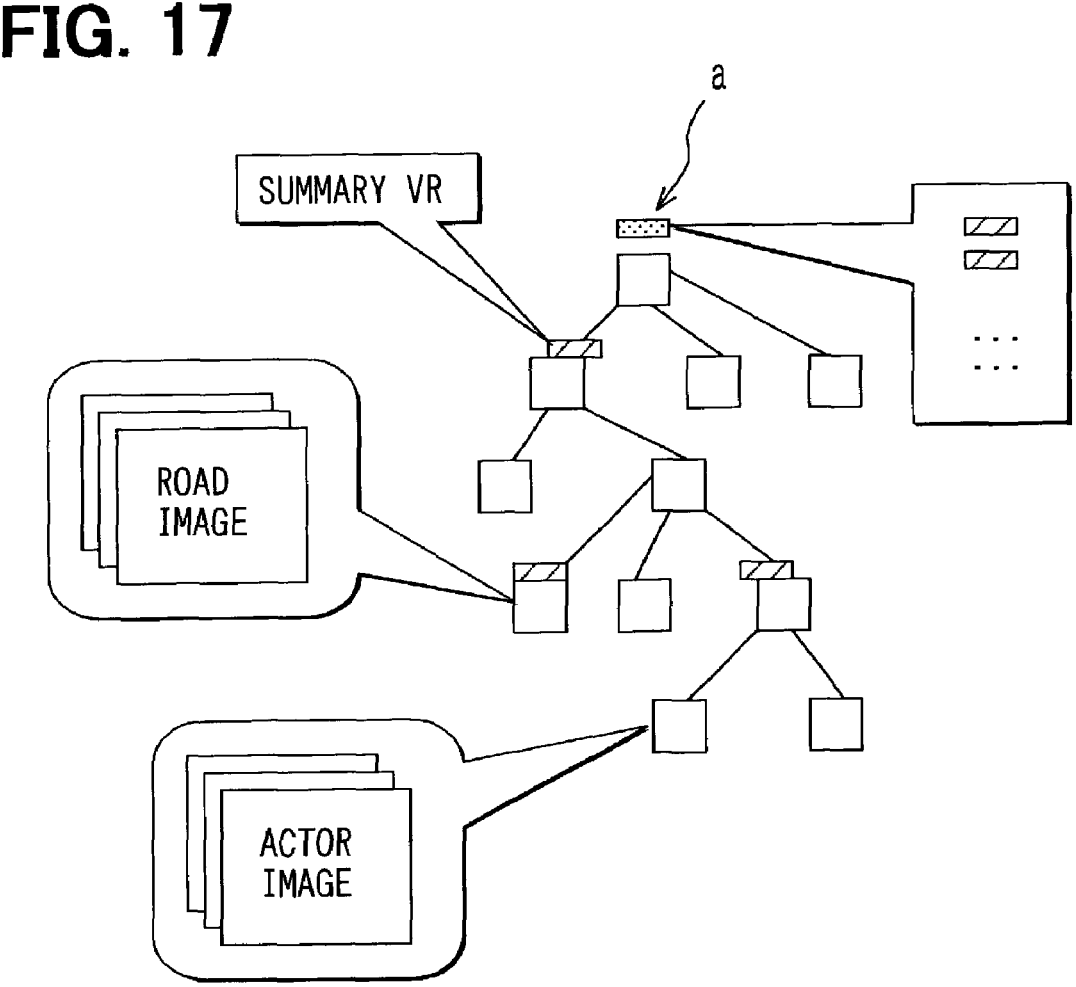
FIG. 17 is an explanatory diagram showing layering based on division of contents.

One feature vector is usually given to contents. As shown in FIG. 17, it is also possible to give a feature vector to a segment (unit of dividing contents) in metadata or each layer constructed by a collection of segments.

In the case of adapting the idea of a collection of segments, division can be defined in the following categories.

<2-1>-5-(1)-[1] Spatial Division

Contents are divided by space coordinates in a scene. For example, it corresponds to extraction and labeling of an object. A segment group constructed by a collection of objects forms a layer.

<2-1>-5-(1)-[2] Time Division

Contents are divided in units in the time direction of a scene. For example, each of a scene, a shot or a set of scenes or shots generated by scene cutting or shot division corresponds to a segment. A segment group constructs a layer.

Since the feature vector in this case can be associated with summary of each segment, it will be called a summary vector. The summary vector is added to each shot in the case of a video image, in order to improve search easiness, a list of summary vectors of shots may be provided in the uppermost layer as shown by a reference character "a" in FIG. 17.

<2-1>-5-(2) Layering Based on Division of Feature Vector

Figure 18:
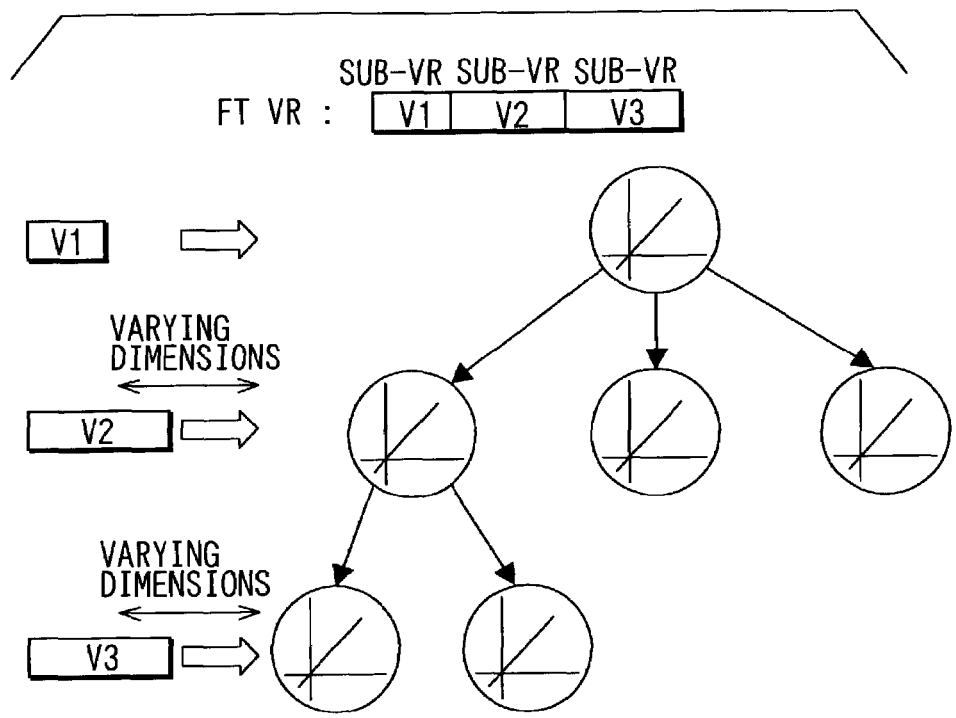
FIG. 18 is an explanatory diagram showing layering based on division of an attribute base.

As shown in FIG. 18, a feature vector of certain contents is described so as to be divided into a plurality of sub-vectors, thereby layering contents classes.

For example, a feature vector V having attribute bases as shown below can be decomposed into sub-vectors V0, V1, V2, and V3.

V=(SPlace, Stime, Actor, Genre, Weather, Csize, CodSch, Cost)
V0=(Weather)
V1=(SPlace, Stime)
V2=(Actor, Genre)
V3=(Csize, CodSch, Cost)

By dividing the feature vector itself, layering is realized and, accordingly, a high-speed search can be realized. For example, by making a search with respect to the sub-vector V1, a search regarding time and place can be conducted and target contents can be narrowed at higher speed.

<2-1>-5-(3) Layering Based on Division of Feature Vector Space

Figure 19A:
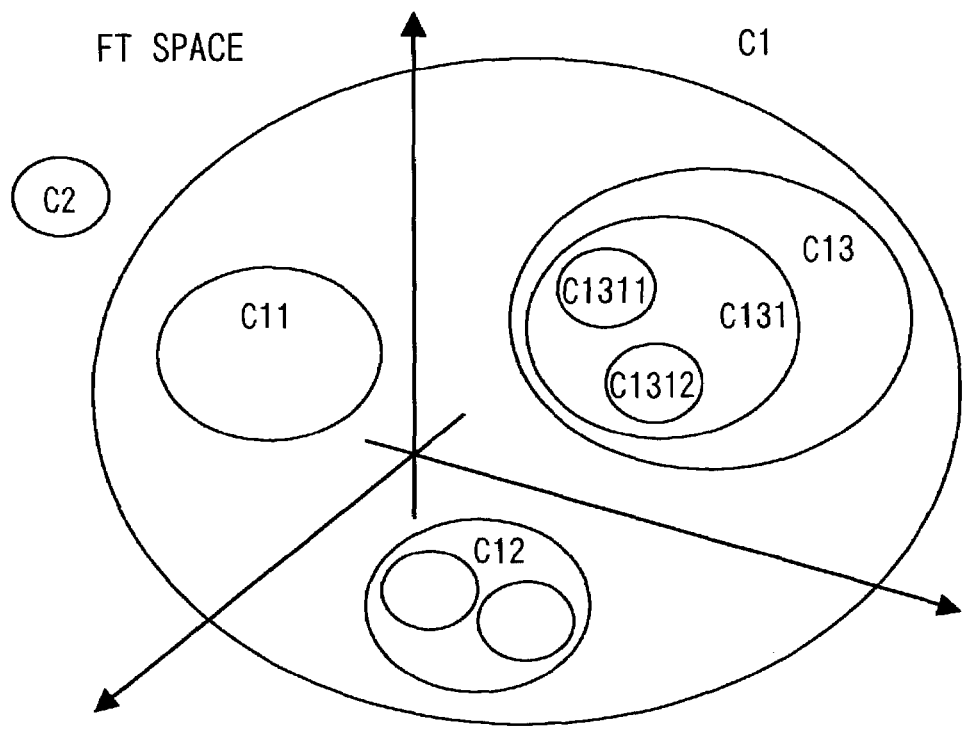
FIGS. 19A and 19B are explanatory diagrams showing layering based on division of a feature space.
Figure 19B:
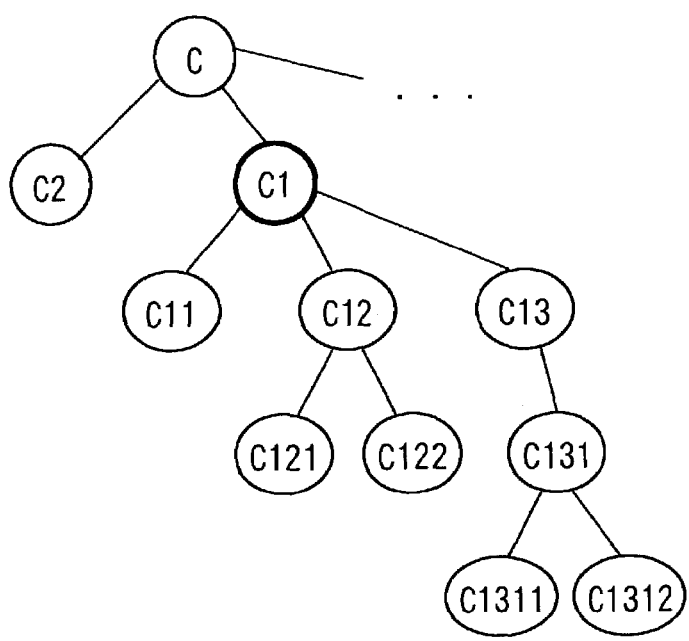

As shown in FIG. 19A, a feature vector group in a feature space can be grouped into attribute dimensions. Specifically, when a feature space of an attribute dimension is considered, a distance can be defined in the feature space and an inclusion relation and a causal relation are obtained from the distance. Therefore, layers as shown in FIG. 19B can be constructed and labeled.

For example, by considering a user locus based on categories of period time and place of the user, a user model can be generated.

Figure 20:
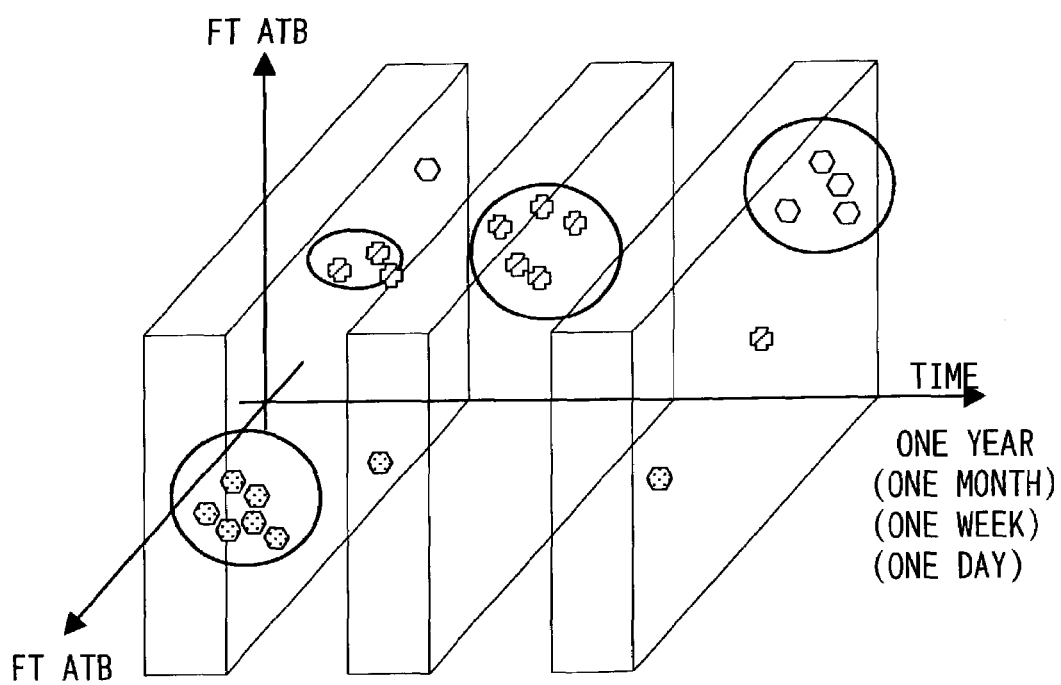
FIG. 20 is an explanatory diagram showing grouping of vectors in consideration of period time.

<2-1>-5-(3)-[1] A feature vector group of which inquiry occurrence frequency is high is grouped every period time zone (morning, daytime, and night time, spring, summer, fall, and winter, and the like). As a time base, period time (day, week, month, year, or the like) is applied. For example, as shown in FIG. 20, when the range of period time is expressed in a rectangular parallelepiped, feature vectors of which end points are included in the range are grouped.

<2-1>-5-(3)-[2] According to place categories (home, highway, restaurant, park, company, amusement part, skiing ground, and the like), feature vectors of high inquiry generation frequency are grouped.

<2-1>-5-(3)-[3] Feature vectors of high inquiry generation frequency are grouped in each aspect.

To a cluster as a set of feature vectors grouped, information is further given by history of inquiries and structuring is advanced. The structuring by the inquiry history will be described later. For example, by structuring based on the causal relation between clusters, layering can be further performed. Concretely, grouping based on the causal relation of contents or grouping based on the causal relation of user behaviors is performed.

By the layering based on the causal relation, clusters are associated with each other. Thus, a proper information retrieval becomes possible.

<2-2>Search

A search method implemented in the information center 5 will now be described.

The applicant of the invention has proposed high-speed search using dependence vector in Japanese Patent Application No. 2001-1365. Also in the embodiment, such a technique of vector search is employed. Inherently, the high-speed search method is not related to the fact that whether a vector is a dependence vector or not. The principle of high speed is that a process of contents data of a relatively large amount to be inherently analyzed can be skipped by simple determination using a small amount of data (or label) typified by a vector format.

First, the outline of a search process will be described on the basis of flowcharts of FIGS. 21, 22, and 23.

In Step 500, an inquiry profile is read. In Step 510, the type of an inquiry vector is determined. The vector types are as described above. In Step 520, a keyword in the inquiry profile and an attribute value of an inquiry vector are checked.

Based on a result of the check in Step 520, whether keywords are sufficient or not is determined in Step 530. When it is determined that keywords are sufficient (YES in Step 530), without executing the process in Step 540, the program advances to Step 550. On the other hand, when it is determined that keywords are not sufficient (NO in Step 530), a keyword is generated, associated, and evaluated in Step 540. After that, the program advances to Step 550.

In Step 550, a viewpoint is changed. A change of a viewpoint denotes that when an inquiry vector is expressed in the feature space, a converting process is performed on the basis of user information. The change of a viewpoint is one of characteristics of the embodiment.

In subsequent Step 560, a search method is selected on the basis of a speedup ratio. In Step 570, an evaluation function is corrected.

Figure 22:
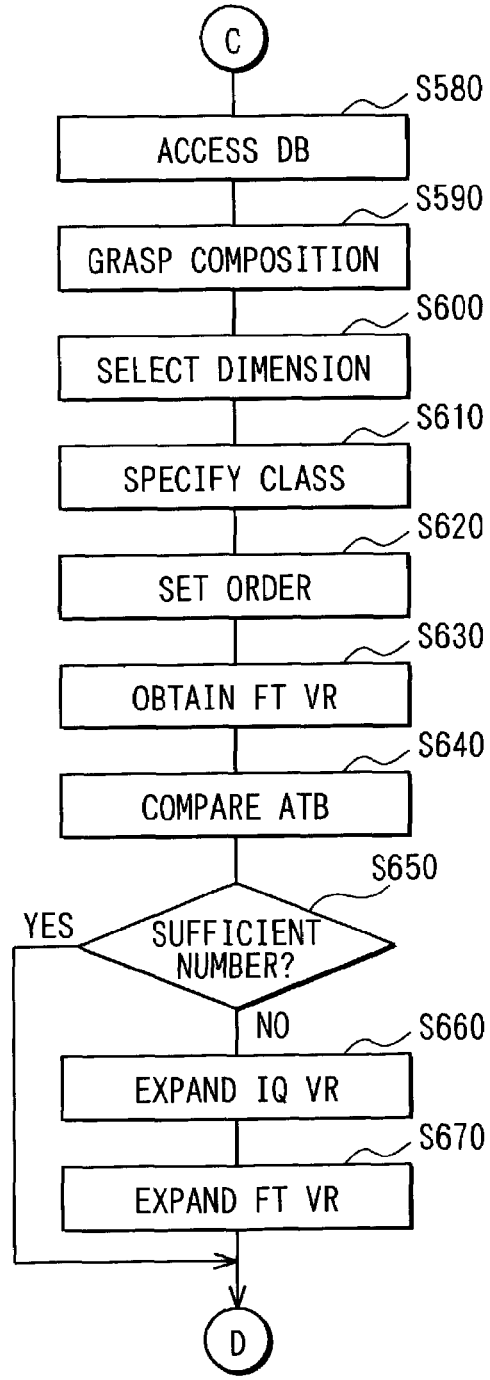
FIG. 22 is a flowchart showing an intermediate portion of the search process.

In Step 580 in FIG. 22, the feature vector database 57 is accessed. In Step 590, the dimensional composition of the feature vector is grasped. In Step 600, a vector dimension is selected. In Step 610, a class of a feature space is specified. By specifying the class of a specific dimension, a search range can be narrowed.

In Step 620, feature vector retrieval order is set. In Step 630, a feature vector is obtained. In Step 640, the inquiry attribute and the feature attribute are compared with each other. In Step 650, whether the number of components is sufficient or not is determined. When it is determined that the number of components is sufficient (YES in Step 650), the program advances to Step 680 in FIG. 23. On the other hand, when it is determined that the number of components is insufficient (NO in Step 650), the program advances to Step 660. In Step 660, the inquiry vector is expanded. In Step 670, the feature vector is expanded. After that, the program advances to Step 680 in FIG. 23.

In Step 680, the feature vector is evaluated. In Step 690, whether the evaluation satisfies an evaluation reference or not is determined. When it is determined that the evaluation value satisfies the evaluation reference (YES in Step 690), the program advances to Step 700. When it is determined that the evaluation value does not satisfy the evaluation reference (NO in Step 690), processes from Step 580 in FIG. 22 are repeated.

In Step 700, an evaluation of the feature attribute value is made. In Step 710, whether the search is finished or not is determined. When it is determined that the search is finished (YES in Step 710), the program advances to Step 720. On the other hand, when it is determined that the search is not finished (NO in Step 710), the processes from Step 580 in FIG. 22 are repeated.

In Step 720, the feature space is divided and structured. In Step 730, the feature vector is moved and relocated. In Step 740, the contents description is corrected. After the process in Step 740 is finished, the search process is finished.

The outline of the search process has been described above. In order to deepen understanding on the processes, characteristic processes will be described concretely one by one.

<2-2>-1 Adaptation of Search Process on the Basis of Speedup Ratio

High speed of a search is largely influenced by a label hit ratio and, concretely, can be quantified as a speedup ratio.

For example, the speedup ratio K can be expressed as follows as an example in a model of the search method.

$$K=(1+\alpha)/(\alpha+\beta+\gamma-\beta\gamma)$$

$\alpha$, $\beta$, and $\gamma$ are defined as follows.
$\alpha = Toc/Tp1$
$\beta = n/N$
$\gamma = Td1/T1$
where
n: the number of contents of which labels are hit
N: the number of contents to be retrieved
Toc: time required to open/close a metadata file
Tp1: time required to analyze all of the contents of one piece of metadata including a label
Td1: time required to analyze only label in one piece of metadata including label
T1: time required to perform a process of searching a group of all of N contents by using labels Therefore, it becomes effective to evaluate the speedup ratio on the basis of statistical properties of an inquiry and a contents label and, after that, to switch the search method.

Figure 24:
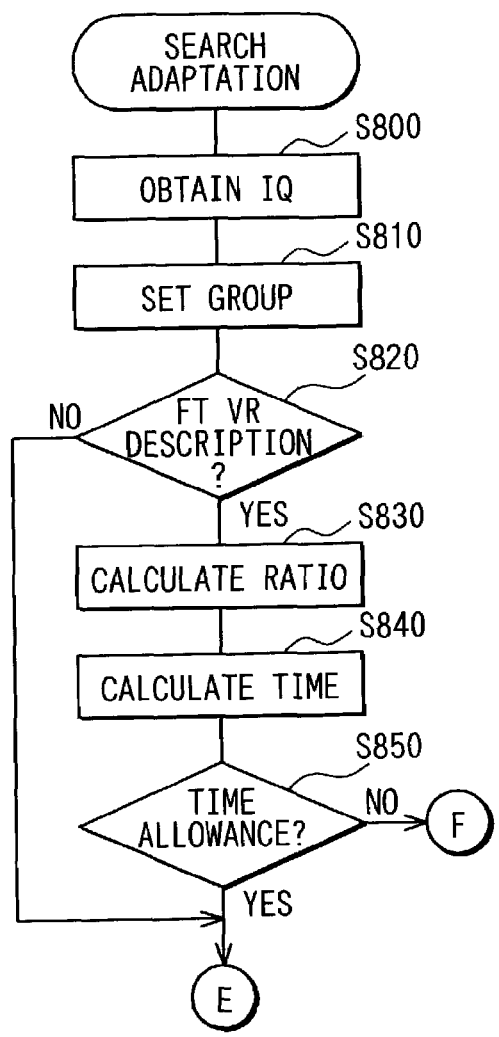
FIG. 24 is a flowchart showing an earlier portion of a search adaptation process.
Figure 25:
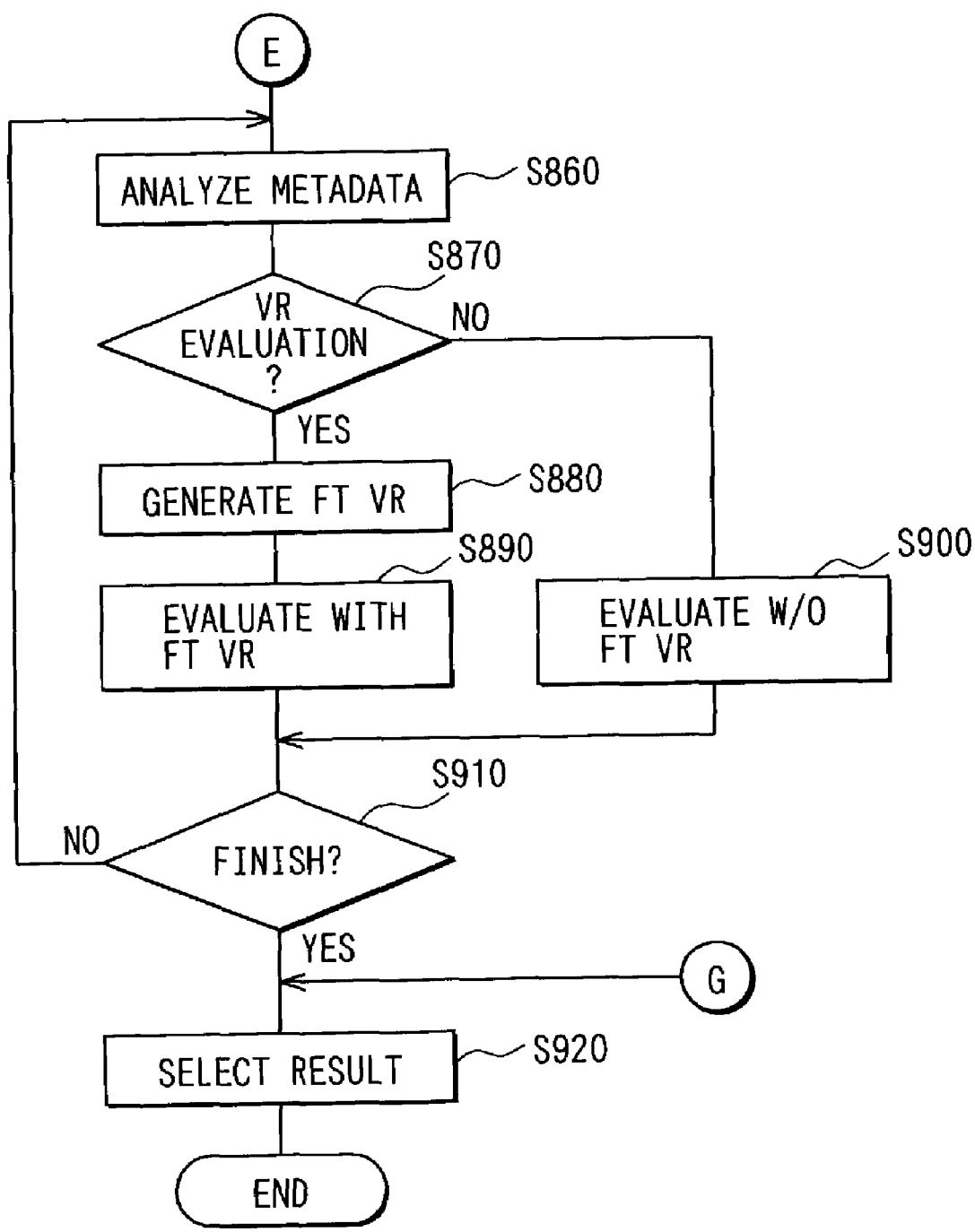
FIG. 25 is a flowchart showing an intermediate portion of the search adaptation process.
Figure 26:
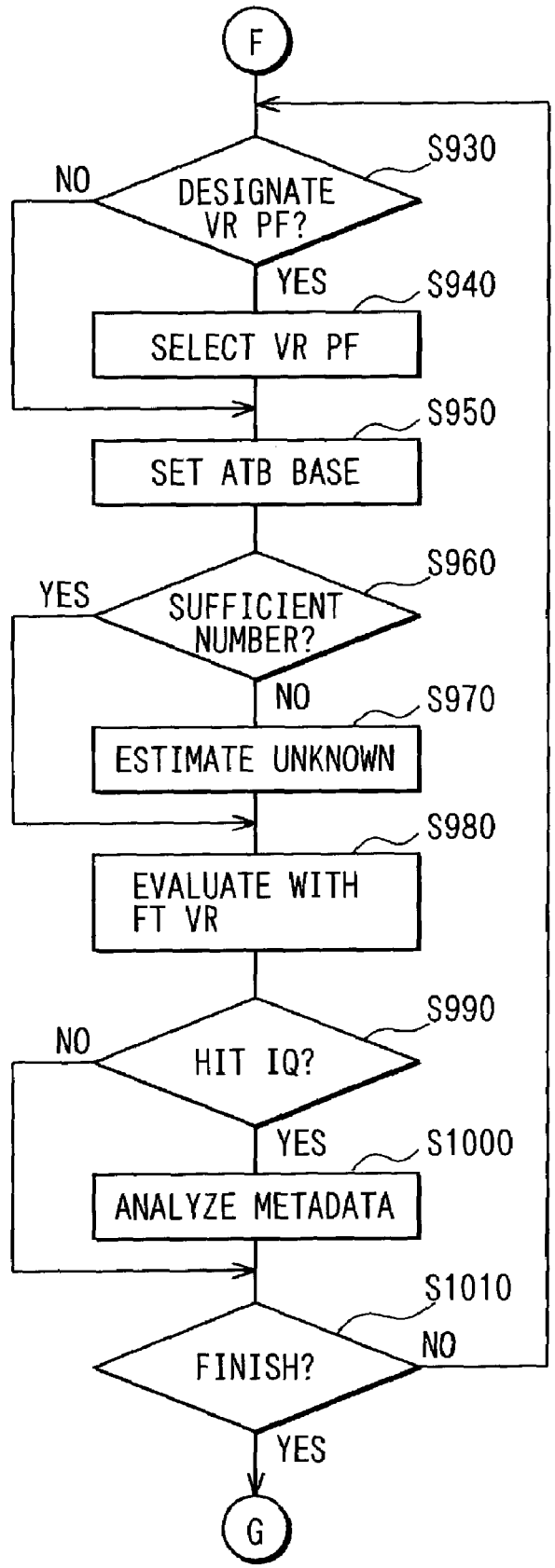
FIG. 26 is a flowchart showing a later portion of the search adaptation process.

The flowcharts of FIGS. 24, 25, and 26 show an example of adaptation of the search process.

When the process is started, an inquiry is obtained (Step 800 in FIG. 24) and an object contents group is set (Step 810). When the object contents group employs feature vector description (YES in Step 820), speedup ratio and estimated search time are calculated (Step 830 and Step 840). If there is an allowance in the search time (YES in Step 850), the program advances to Step 860 in FIG. 25. If there is no allowance in the search time (NO in Step 850), the program advances to Step 930 in FIG. 26. On the other hand, if the feature vector description is not employed (NO in Step 820), the program advances to Step 860 in FIG. 25.

In Step 860 in FIG. 25, metadata of the object contents are completely analyzed. When a vector evaluation is suitable (YES in Step 870), a feature vector is generated from the metadata (Step 880), a contents evaluation using a feature vector is made (Step 890), and the program advances to Step 910. On the other hand, when the vector evaluation is not suitable (NO in Step 870), a contents evaluation is made without using a feature vector (Step 900), and the program advances to Step 910.

In Step 910, whether a search is finished or not is determined. When it is determined that the search is finished (YES in Step 910), a final search result is selected (Step 920), and the retrieval adaptive process is finished. On the other hand, when it is determined that the search is not finished (NO in Step 910), the next contents are selected and the processes from Step 860 are repeated.

In Step 930 in FIG. 26, when a vector profile is designated (YES in Step 930), the vector profile is selected (Step 940) and the program is shifted to Step 950. On the other hand, when there is no designation of a vector profile (NO in Step 930), the program directly advances to Step 950.

In Step 950, the attribute bases of an inquiry vector and a feature vector are set. When the number of attributes for evaluation is sufficient (YES in Step 960), the program advances to Step 980. On the other hand, when the number of attributes for evaluation is not sufficient (NO in Step 960), an unknown attribute is estimated (Step 970), and the program advances to S980.

In Step 980, a contents evaluation using a feature vector is made. Whether a hit is found regarding an inquiry or not is determined (Step 990). When a hit is found regarding the inquiry (YES in Step 990), metadata are completely analyzed and evaluated (Step 1000), and the program advances to Step 1010. On the other hand, when no hit is found for an inquiry (NO in Step 990), the program advances to Step 1010 without executing the process of Step 1000.

In Step 1010, whether the search is finished or not is determined. When it is determined that the search is finished (YES in Step 1010), the program advances to Step 920 in FIG. 25. On the other hand, when it is determined that the search is not finished (NO in Step 1010), the following contents are selected and the processes from Step 930 are repeated.

The evaluation of contents is made by comparing the feature vector and the feature keyword included in the contents description with the contents of the inquiry profile. For example, a search order of performing primary filtering for evaluation of a feature vector and, after that, narrowing the contents by evaluation of the keyword may be used. However, the invention is not limited to the order.

Figure 21:
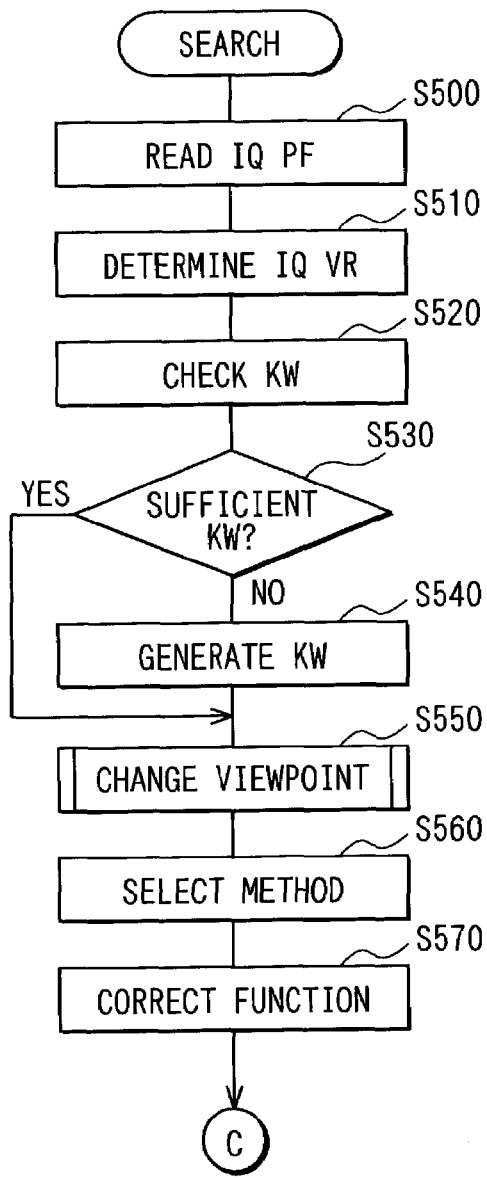
FIG. 21 is a flowchart showing an earlier portion of a search process.

<2-2>-2 Generation, Association, and Evaluation of Feature Keyword (Step 540 in FIG. 21)

A feature keyword is evaluated by comparison with a search keyword. The feature keyword is a keyword given to contents.

As a comparing method in this case, a method of replacing all of keywords with numerical value data and comparing the data, a method of comparing the keywords with reference to a keyword comparison evaluation table, a method of evaluating and comparing the keywords by using keyword association network information, or the like can be used.

A case of comparing a search keyword with a feature keyword by reading an evaluation value with reference to a table will be described.

For example, in the case where a search keyword is "Spanish dish," it is assumed that data with evaluation values such as Paeria (100), Churro (30), Gazpacho (40), Pasta (70), and bullfighting (80) is read. On the other hand, when the feature keywords of the contents are Paeria, Pasta, and bullfighting, the evaluation value of the contents can be calculated as, for example, 100+30+80=210.

When there is a search keyword in an inquiry profile, a search is conducted on the basis of the search keyword. When there is no search keyword in the inquiry profile, a search is conducted on the basis of only an inquiry vector. As another method, a search keyword may be generated from past inquiries stored as the retrieval history 56 and the user profile.

It is also possible to perform a vector search first and obtain a keyword corresponding to contents from which an evaluation value equal to or larger than a threshold value is obtained. For example, when 10 contents are hit, high-order keywords in keywords accompanying feature vectors corresponding to the ten contents are selected.

Further, another keyword may be associated from a certain keyword. As such an association method, there are a table method and a method using a word network.

In the table method, by referring to a table in which keywords associated from a keyword which is input or generated are preliminarily stored, for example, a group of ten search keywords is generated finally.

In the method using a word network, a network indicative of association between words is prepared, and a path from an input keyword as a fire point on the network to another keyword is retrieved. By using the number of paths as a score, a keyword of a high score value is selected.

Figure 27:
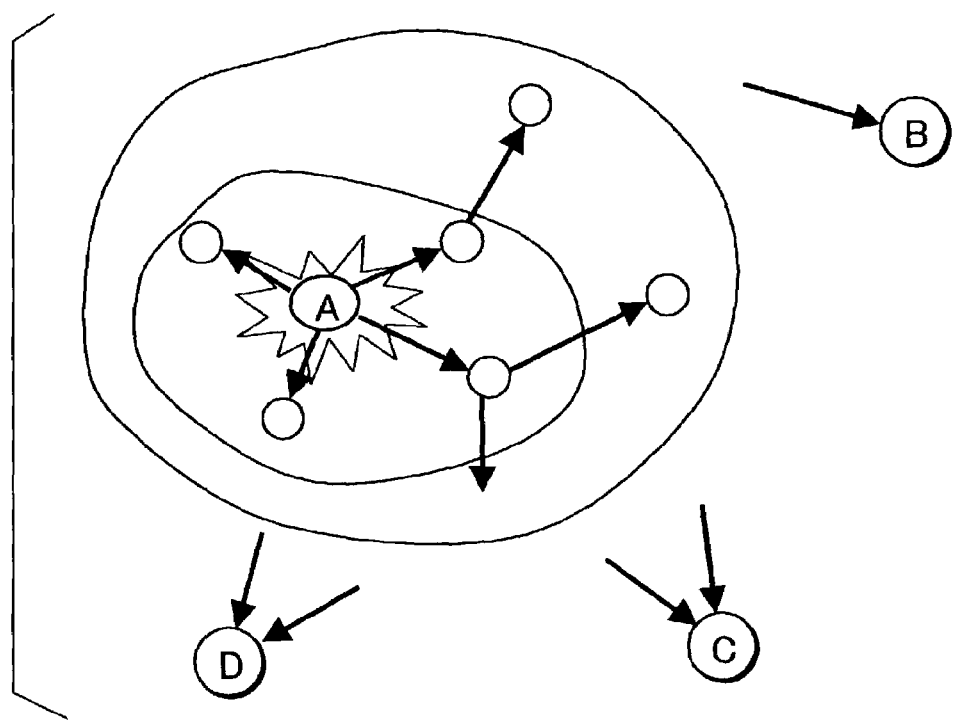
FIG. 27 is an explanatory diagram showing association of a keyword by a word network.

As shown in FIG. 27, a related keyword in the same dictionary or word cluster as a keyword A is activated or a dictionary to which the keyword A belongs or a dictionary (word cluster) other than a word cluster is activated. In such a manner, the word network is associated with keywords B, C, and D.

<2-2>-3 Vector Evaluation According to Search Keyword

Not only comparison between the search keyword and the feature keyword but also evaluation of a feature vector according to a search keyword can be made. Specifically, according to the search keyword, the vector evaluation value varies for even the same feature vector.

It is assumed that when attribute specifications are (Splace, Stime, Actor, Genre, Weather, Csize, CodSch, Cost), a feature vector V1 (video image of the Kisosansen Park) corresponds to a keyword "travel information" and V1=(DA0EF6F0).

A case where an inquiry vector of the inquiry profile and the search keyword are as follows will be considered.

<Inquiry Vector>

Q=(FF000000)

<Search Keywords> object: to go to rest room emergency: 100 present location: city area

In this case, the object is to go to a rest room and emergency is high, so that a weighting on the attribute base Splace may be, for example, doubled.

Usually, the inner product between the inquiry vector and the feature vector is calculated as follows.

$$\text{Evaluation value } E = Q \cdot V1$$
$$= (\text{FF000000})(\text{DA0EF6F0})$$
$$= 15 \times 13 + 15 \times 10 = 345$$

A weighting on the base attribute Splace is doubled and the evaluation value E is calculated as follows.

$$\text{Evaluation value } E = 2 \times 15 \times 13 + 15 \times 10 = 540$$

<2-2>-4 Change in Evaluation Value

It has been described above that the evaluation value for a feature vector can be adjusted by a weighting using a keyword of an inquiry profile.

However, according to an application and the characteristics of an individual, it becomes necessary to emphasize an attribute dimension which is particularly important for a search or eliminate an attribute dimension. The evaluation value has to be increased by assigning a weighting on an attribute. On the other hand, an attribute which produces a terrible adverse effect on evaluation of a user has to be eliminated.

For example, feature vectors of two restaurants A and B are as follows with the attribute bases (the degree of family-orientation, the degree of neatness, and smoker-friendliness).

feature vector of restaurant A: (80, 70, 90)
feature vector of restaurant B: (80, 60, 0)
On the other hand, when an inquiry vector is
(degree of family-orientation, degree of neatness)=(100, 60),
it seems that the two restaurants A and B satisfy the two attributes. However, as one of the characteristics of the user, if "smoker-friendliness$\leq 50$", is desired, the evaluation value of the restaurant A has to be dramatically decreased. For example, when the condition is not satisfied, the evaluation value standardized in 10 levels has to be uniformly set to "2." As a result, the restaurant B having a lower evaluation value than that of the restaurant A is retrieved as a more preferable restaurant to the inquiry.

<2-2>-5 Method of Increasing Search Speed

A feature vector is inherently data of a small amount. Even when all of components are subjected to a search process, an effect of a high-speed process is produced sufficiently. By applying the same idea as a cyclic first-dimension search of a three-dimensional position posture disclosed in Japanese Patent No. 2778430 or multi-stage in Japanese Patent Laid-open No. 2000-221991 to a vector search of a feature space, the speed can be further increased. Particularly, in the case of information retrieval, by preferentially determining dependence on "time, place," in an inquiry and promptly evaluating attribute values of "time, place," efficiency is higher.

<2-2>-6 Search According to Class in Feature Space (Step 610 in FIG. 22)

Figure 28:
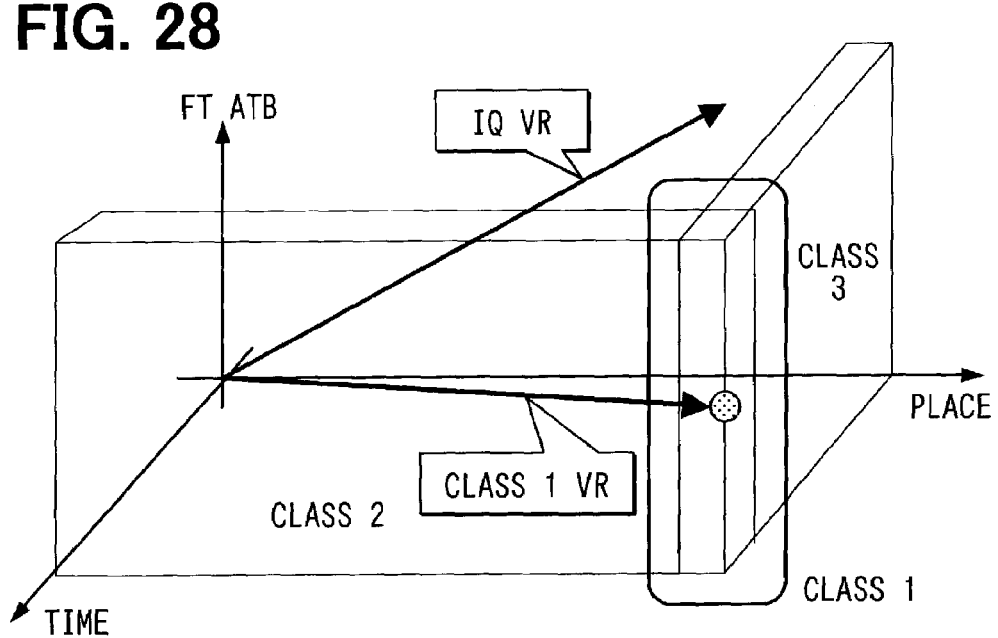
FIG. 28 is an explanatory diagram showing classification of a feature space.

If it is known that dependence on main parameters such as time and place is high in an inquiry, in the feature space as well, a partial space formed by the main parameters can be divided into classes as shown in FIG. 28. In this case, a class identifier is assigned to a vector belonging to each class.

By the classification, for example, when the dependence on time and place of an inquiry vector is the highest value as follows:

dependence on time=F
dependence on place=F

A search can be conducted by focusing on an area around the class 1 in FIG. 28 from the beginning.

<2-2>-7 Expansion of Vector (Step 660 and Step 670 in FIG. 22)

Figure 29A:
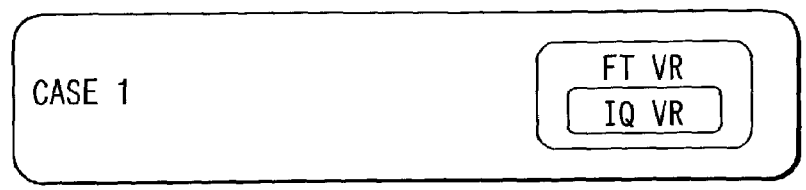
FIGS. 29A, 29B, and 29C are explanatory diagrams each showing relations between an inquiry vector and a feature vector.
Figure 29B:
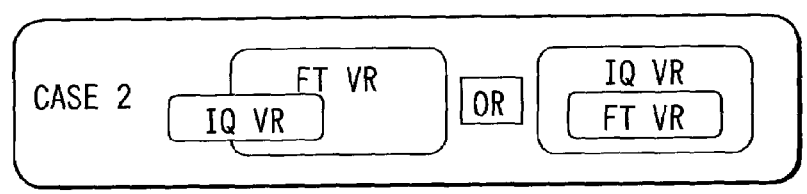
Figure 29C:
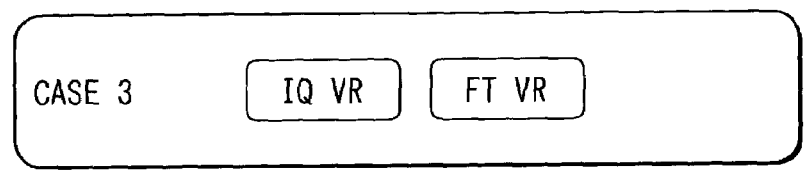

At the time of evaluating contents by computation of an inquiry vector and a contents feature vector, the dimensions (attribute bases) of vectors do not always match each other. The relation between the inquiry vector and the feature vector is classified into three cases as shown in FIGS. 29A, 29B, and 29C.

Case 1) A component of an inquiry vector is included in components described by a feature vector.

In this case, the contents evaluation computation can be executed within the range of components of the inquiry vector.

Case 2) Although some components of the inquiry vector and the feature vector are overlapped, all of the components are not used.

When the number of overlapping components is large, evaluation computation can be executed. If the number is insufficient, vector expansion is carried out.

Case 3) The components of the inquiry vector and those of the feature vector do not overlap each other.

In this case, in principle, a low evaluation value is given. Alternately, the inquiry vector or the feature vector may be expanded.

Figure 30:
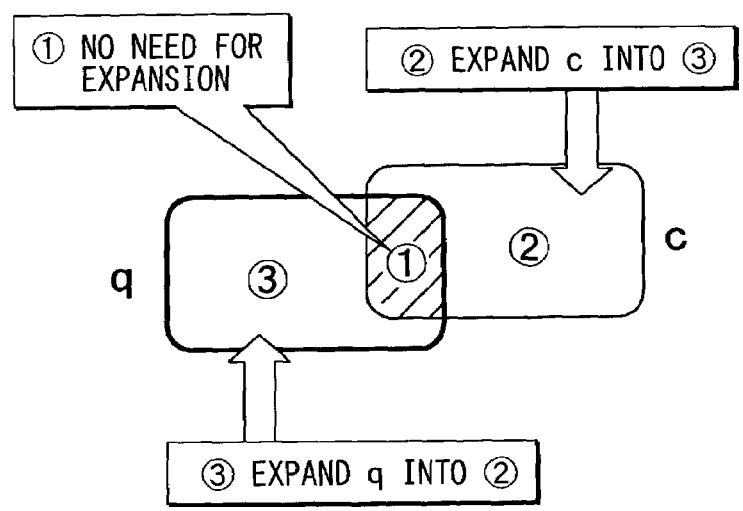
FIG. 30 is an explanatory diagram showing expansion of the inquiry vector and the feature vector.

FIG. 30 shows an image of expansion of a vector. Since the overlapping of the components can be also regarded as a kind of an index indicative of distance between vectors, the number of overlapped components of the inquiry vector (q) and the feature vector (C) may be added to a contents evaluation value.

<2-2>-7-(1) Expansion of Inquiry Vector (Step 660 in FIG. 22)

An insufficient component in an inquiry vector is estimated and the inquiry vector is expanded.

Method 1) expansion by association from a related keyword

Method 2) A nearby vector in the same dimension is sampled and a new dimension of the vector is added.

For example, in the case of an inquiry vector A=(a1, a2, a3, a4) of travel information and an inquiry vector B=(a1, a2, a3, b1, b2, b3) of restaurants, a distance SL between A and B with respect to the overlapped components [a1, a2, a3] is calculated.

SL (A,B)=dist(SA,SB)
SA=(a1(A), a2(A), a3(A))
SB=(a1(B), a2(B), a3(B))

where ai(X) denotes a component value of a dimension ai in a vector X.

In the case of SL satisfying the following relation with respect to a threshold SLth SL$\leq$SLth, it is regarded that B is close to A in a space formed by [a1, a2, a3].

The vector A is expanded with [b1, b2, b3], thereby obtaining a new inquiry vector Ae.

Ae=(a1, a2, a3, a4, b1, b2, b3)

The component values of B may be used as they are. When the number of overlapped components with a feature vector in target contents becomes sufficiently large, contents evaluation calculation is executed. If it is not insufficient, the vector expansion is further continued.

<2-2>-7-(2) Expansion of Feature Vector (Step 670 in FIG. 22)

Since the feature vector indicates features of contents, it is estimated on the basis of a keyword group derived from a keyword in contents description (metadata). The feature vector is expanded also on the basis of inquiry history from the user including the other users.

Figure 23:
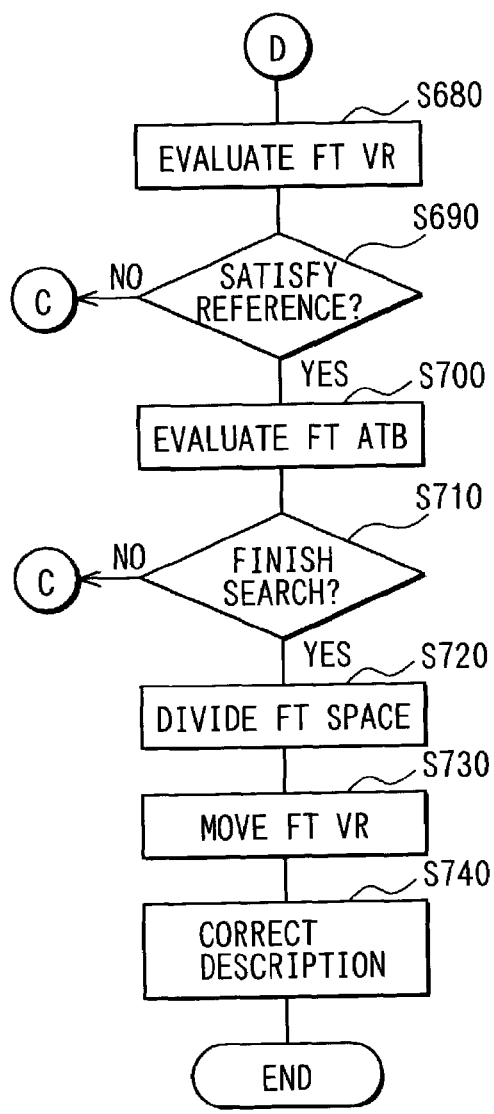
FIG. 23 is a flowchart showing a later portion of the search process.

<2-2>-7-(3) Expansion by Inquiry History (Step 720, Step 730, and Step 740 in FIG. 23)

Figure 31A:
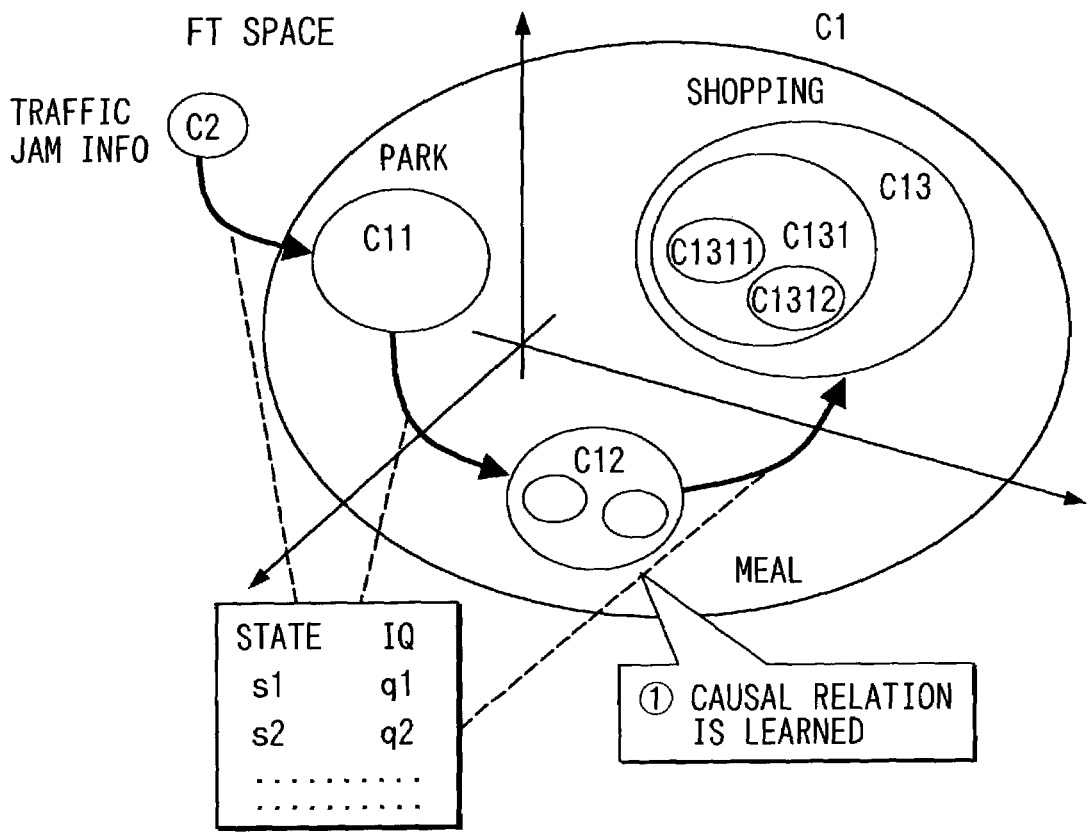
FIGS. 31A and 31B are explanatory diagrams showing learning of a causal relation from an inquiry.
Figure 31B:
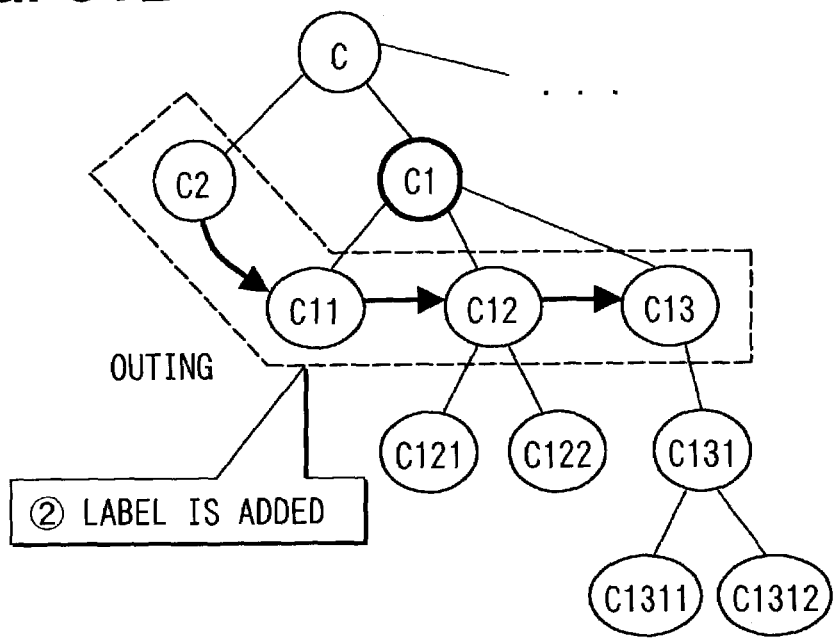

Feedback is given to a feature space by using a history of a series of inquiring operations (including search keyword, inquiry vector, contents selection result, and evaluation), the feature space is structured or divided, and a feature vector is re-arranged, moved, or the like. For example, as shown in FIG. 31A, the causal relation in a series of actions of park, meal, and shopping is learned. By the learning, a label of "outing" as shown in FIG. 31B can be added.

The operations are temporary operations performed within the range of permissible search time and, moreover, to the user who is making an inquiry. Therefore, whether the feature space as a common database is rewritten or not is determined by the system. The operation of rewriting the database itself will be described later.

The method of layering feature vectors of the contents has been described above. At the time of a search, an inquiry profile can be used.

That is, the inquiry profile can be used for the above-described division of a feature space, re-location of a feature vector, movement of a feature vector, and the like. In the inquiry profile, together with inquiry information, user information based on a user profile is described. Therefore, the information center 5 side can be optimized in consideration of the factors on the user terminal 3 side.

<2-2>-8 Correction of Evaluation Function (Step 570 in FIG. 21)

<2-2>-8-(1) Method of Evaluating Feature Vector Including Undefined Component

It is assumed that each of an inquiry vector Q and a feature vector C of contents includes an undefined value as follows.

Q=(1, 3, 2, 8, X1)
C=(3, X2, 4, 2, X3)

In this case, the evaluation value E of contents is obtained by inter product computation as follows.

$$E = A \cdot B = 1*3 + 3*X1 + 2*4 + 8*2 + X2*X3$$

In this case, any of the following methods is employed in accordance with determination of a predetermined condition so that the evaluation value E becomes a concrete numerical value.

<2-2>-8-(1)-[1] As an average of 10 levels, X1=X2=X3=5 is unconditionally set.

<2-2>-8-(1)-[2] The values are replaced with average values Mi in the i-th component as X1=M5, X2=M2, and X3=M5.

<2-2>-8-(1)-[3] A component including X is not calculated as follows.

$$E = 1*3 + 3*0 + 2*4 + 8*2 + 0*0 = 25$$

<2-2>-9 Adaptation of Contents Description (Step 740 in FIG. 23)

Contents stored in the contents database 61 in the information center 5 is used commonly by a plurality of users. It is therefore desirable that contents are described permanently or uniquely.

<2-2>-9-(1) Fixed Description

In a database of a center type dealing a huge number of contents, it is desirable that metadata description originally made at the time of generating contents are fixed. There is the possibility that a plurality of metadata descriptions are made for certain contents. For example, a plurality of proper metadata may be prepared according to the types (sex, age, objects, and the like) of the user.

<2-2>-9-(2) Correction of Description

Description is corrected on the basis of a user evaluation result of contents, a system change, or the like. Even in the case where the user cannot rewrite metadata (including a feature vector) corresponding to various contents on the database, by using a storage area (such as a hard disk) on the user terminal 3, individual feature vector designation using characteristics and profile of the user can be made. For example, traffic jam state in a spot, stock price of a company, the number of people in a scene, and the like correspond to it.

<2-2>-9-(3) Adaptation

Although data necessary for adaptation to each user can be stored on the information center 5 side, considering the aspect of privacy, it is stored in the user terminal 3 side.

Contents of an individual such as a video image of a touristic place recorded by the user can be stored in the user terminal 3.

In this case as well, the contents description can be divided into fixed description and dynamic description. The dynamic description is made in a rewritable storage area.

Such adaptation of contents is made in consideration of the factors such that sense of values and search characteristics on contents vary according to individuals, and search characteristics of even the same user vary according to situations. Particularly, description is controlled or proper one is selected from a plurality of descriptions on the basis of user description in the user profile 38 or the like.

<2-2>-10 Change in Viewpoint (Step 550 in FIG. 21)

<2-2>-10-(1) Importance of Change in Viewpoint

A feature space as a space formed by feature vectors can be a feature space in a certain viewpoint.

Figure 32:
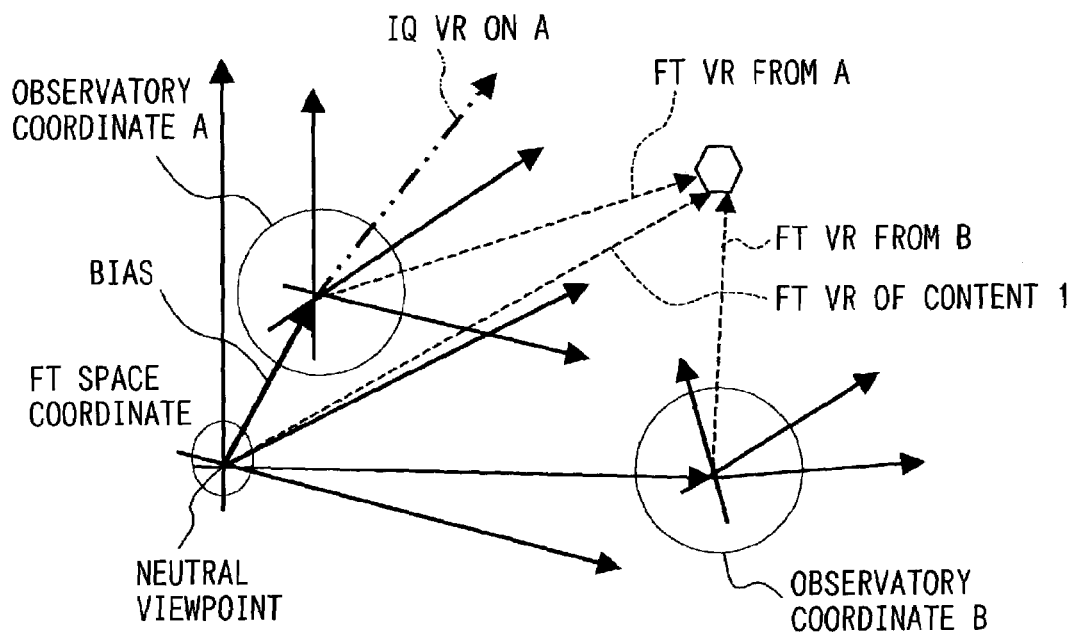
FIG. 32 is an explanatory diagram showing a change in user's viewpoint by coordinate transformation.

As shown in FIG. 32, according to the situations and personal characteristics of the user, the origin of an inquiry vector and a coordinate system (called a user viewpoint) on the feature space are changed.

Specifically, at the time of positioning an inquiry vector on the feature space, the following concepts are introduced.

1) change of a viewpoint of an inquiry
2) scale transformation according to characteristics of an individual and situations In order to uniformly express the concepts, a coordinate system H for observing a vector on the feature space is considered. When an average viewpoint is selected as an initial value, H matches a coordinate system C of the feature space. It is regarded that the coordinate system H is obtained by performing rotation, origin movement, scaling on the coordinate system C of the feature space and can be generally expressed by linear transformation A as follows.

$$H = AC$$

Non-linear scaling can be also used and realized in expression of an evaluation function using an inquiry. In the case of observing a feature vector on C by H, there is the possibility that the sign of an attribute value changes. Constraints in this case may be set as follows.

1) A result of transformation of a feature vector is compensated so that an evaluation of contents is not hindered.
2) A transformation matrix A is restricted.

For example, although there is the difference among individuals, it does not usually happen that dependence on "clear" with respect to an attribute dimension describing dependence on weather is changed to dependence on "rain" at a viewpoint change A. Since H is basically the viewpoint of the user, it is determined by situation description in the user profile. In the case of defining the linear transformation A, it is sufficient to define the linear transformation A on assumption that H depends on the user.

<2-2>-10-(2) Change in Viewpoint by the User Model 37

Figure 33:
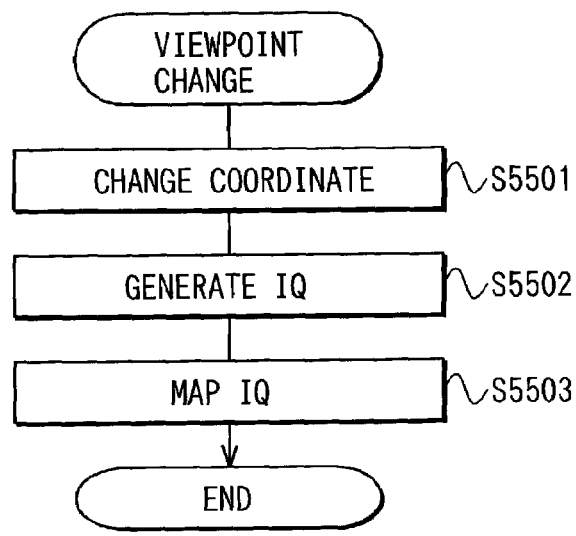
FIG. 33 is a flowchart showing a viewpoint changing process.

FIG. 33 is a flowchart of a viewpoint changing process by the user model 37.

Figure 34:
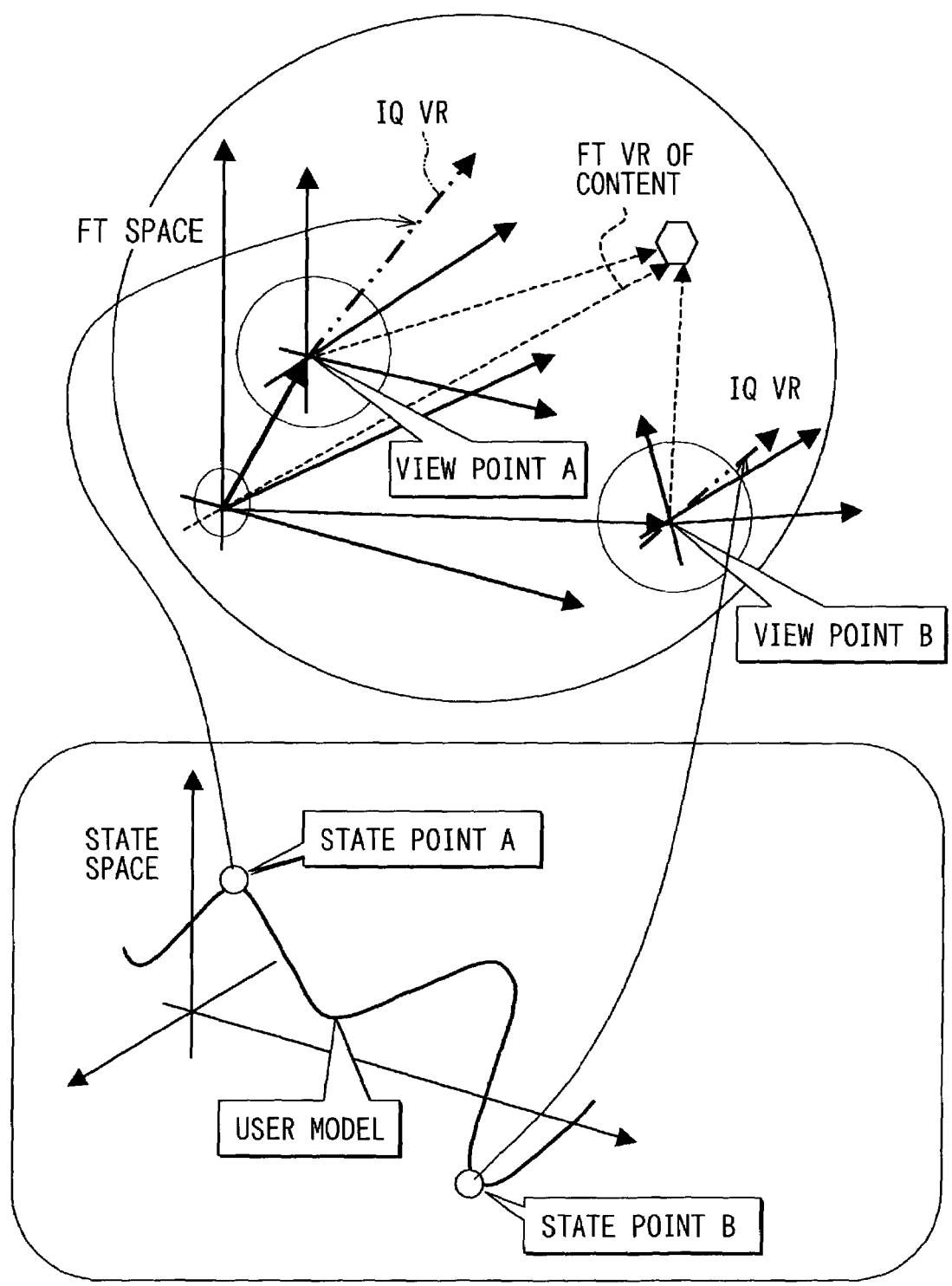
FIG. 34 is an explanatory diagram showing a change in viewpoint based on a user model.

When a process is started, a viewpoint coordinate system on a feature space is generated from a state point (Step 5501). As shown in FIG. 34, viewpoints A and B are generated from state points QA and QB, respectively. After that, an inquiry is generated from the state point (Step 5502). Finally, the inquiry is mapped on the viewpoint coordinate system (Step 5503). The mapping of the inquiry vector is shown by an alternate long and two short dashes line in FIG. 34.

In FIG. 34, according to a change in the viewpoint coordinate system, the position of the vector is changed according to the viewpoint of each user.

<3>Updating of System

Updating of a system denotes not instantaneous adaptation at the time of a search but adaptation on the side of the user terminal 3 and the information center 5 in consideration of many retrieval histories.

Figure 35:
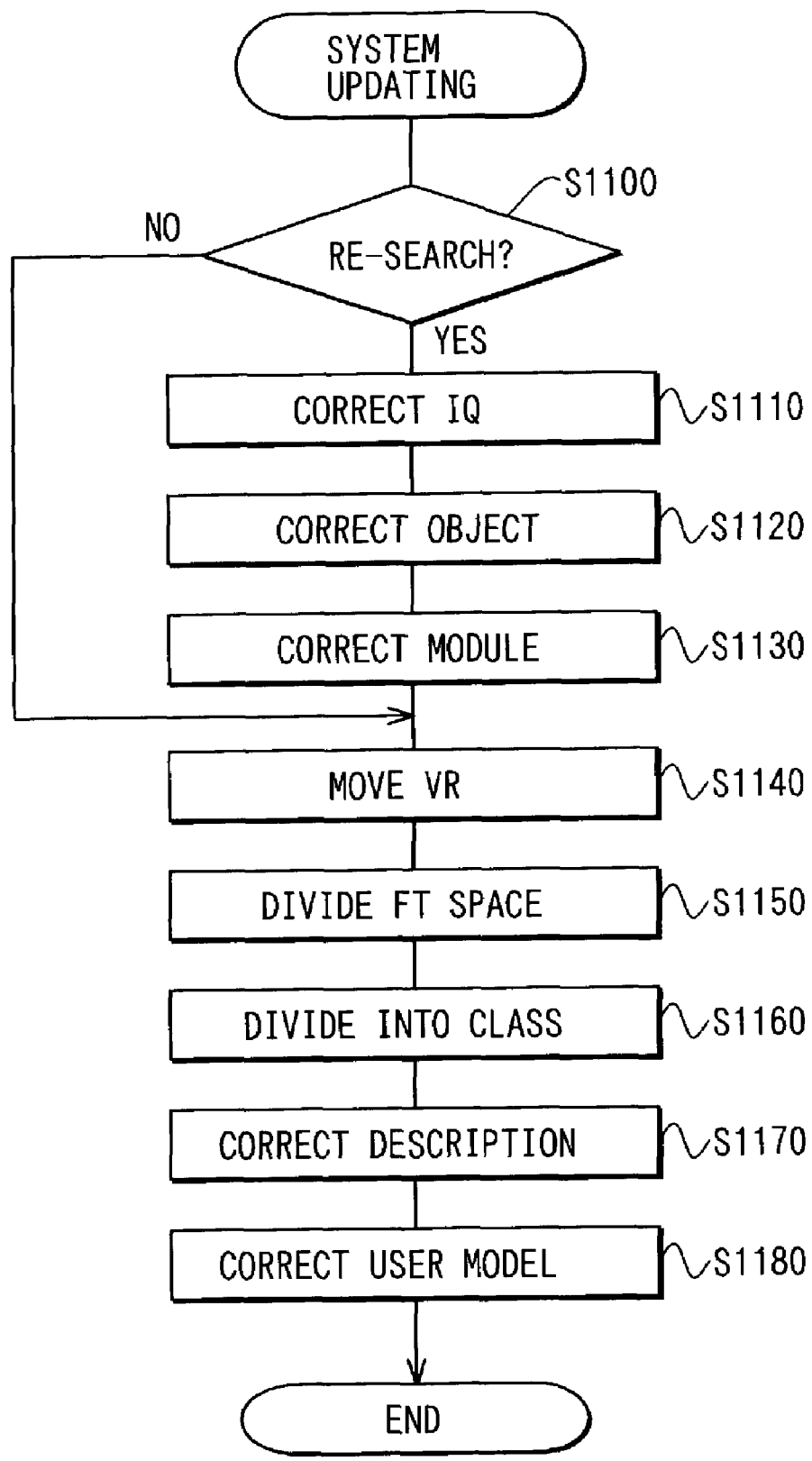
FIG. 35 is a flowchart showing a system updating process.

FIG. 35 is a flowchart showing an updating process of a whole system.

First, in Step 1100, whether operation is re-search or not is determined. When re-search is determined (YES in Step 1100), an inquiry is corrected (Step 1110), a retrieval object is corrected (Step 1120), a search module is corrected (Step 1130), and the program advances to Step 1140. On the other hand, when it is determined that the operation is not a research (NO in Step 1100), the program advances to Step 1140 without executing the processes in Step 1110 to Step 1130.

In Step 1140, a vector is moved/re-located. In Step 1150, a feature space is divided/structured. In Step 1160, the feature space is divided into classes. In Step 1170, the contents description is corrected. In Step 1180, the user model is corrected, and the system updating process is finished.

The outline of the system updating process has been described above. In order to deepen understanding of the above-described processes, characteristic processes will be described concretely one by one.

<3>-1 Feedback of Relevance

As an inquiry develops through interaction, evaluation of the user that the retrieval result is correct can be obtained at a time point. Relevance of the search system under present conditions may be fed back with respect to the following elements.

<3>-1-(1) the user terminal 3 side
<3>-1-(1)-[1] correction of inquiry
<3>-1-(1)-[2] addition/correction of contents description
<3>-1-(1)-[3] correction of a control parameter (such as evaluation function) to be sent to search module
<3>-1-(1)-[4] correction of an instruction parameter (such as URL) to be retrieved which is sent to a search agent
<3>-1-(1)-[5] correction of the user model 37
<3>-1-(2) information center 5 side
<3>-1-(2)-[1] correction of inquiry process characteristic
<3>-1-(2)-[2] addition/correction of contents description
<3>-1-(2)-[3] correction of search module (evaluation function or the like)
<3>-1-(2)-[4] correction of object to be retrieved
<3>-1-(2)-[5] correction of the user model
<3>-2 Correction of User Model (Step 1110 in FIG. 35)

Although correction of an inquiry is made also at the time of a search, correction of an inquiry which is made again after presenting a search result will be described here. That is, the case where Step 1100 is positively determined will be described.

<3>-2-(1) user terminal 3 side
<3>-2-(1)-[1] correction of keyword
<3>-2-(1)-[2] correction of weighting value on keyword
<3>-2-(1)-[3] correction of inquiry vector
<3>-2-(2) information center 5 side
<3>-2-(2)-[1] correction of expansion characteristic of inquiry
<3>-2-(2)-[2] correction of viewpoint information of inquiry
<3>-2-(2)-[3] correction of inquiry vector itself
<3>-3 Addition/Correction of Contents Description (Step 1170 in FIG. 35)

On the user terminal 3 side, contents are written in a rewritable storage area such as a hard disk. For example, since evaluations on a restaurant, on atmosphere of a tea room, and the like vary among individuals, evaluations of a user do not always match with description in a common database. Consequently, the user may write description based on his/her evaluation as a personal database in his/her terminal. Information regarding a new spot which is not registered yet in the common database, temporary conditions (such as occurrence of an accident, traffic jam caused by construction work, secret path information, little-known great spot, etc.) correspond to the evaluations.

<3>-4 Correction of Search Module (Step 1130 in FIG. 35)

The following corrections are considered with respect to a search module.

<3>-4-(1) correction of a reference of applying an evaluation function or an evaluation function itself
<3>-4-(2) correction of a meaning network and a keyword table
<3>-4-(3) correction of characteristic of viewpoint change <3>-5 Correction of Object to be Retrieved (Step 1120 in FIG. 35)

It corresponds to a change in a retrieval site and a change in a database to be searched in the same site. For example, in the case of retrieving product information of a certain manufacturer, if the URL of a homepage in which information of an old model is stored remains, it is changed to the URL of a home page in which information of a new model is stored.

<3>-6 Correction of the User Model 37 (Step 1180 in FIG. 35)

<3>-6-(1) Generation of an Inquiry Based on the User Model 37

Figure 36:
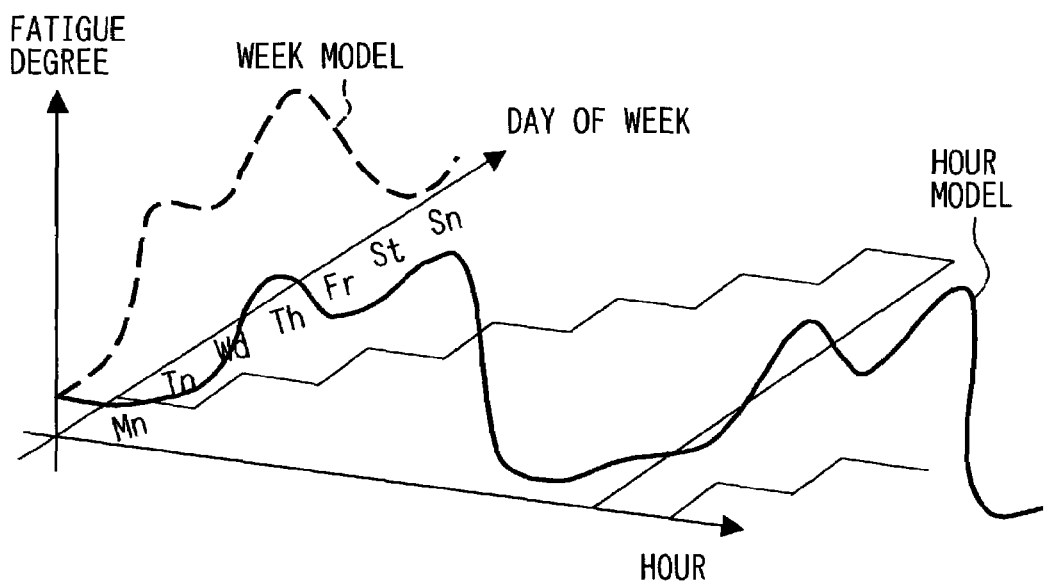
FIG. 36 is an explanatory diagram showing a fatigue model of one week of a user.
Figure 37:
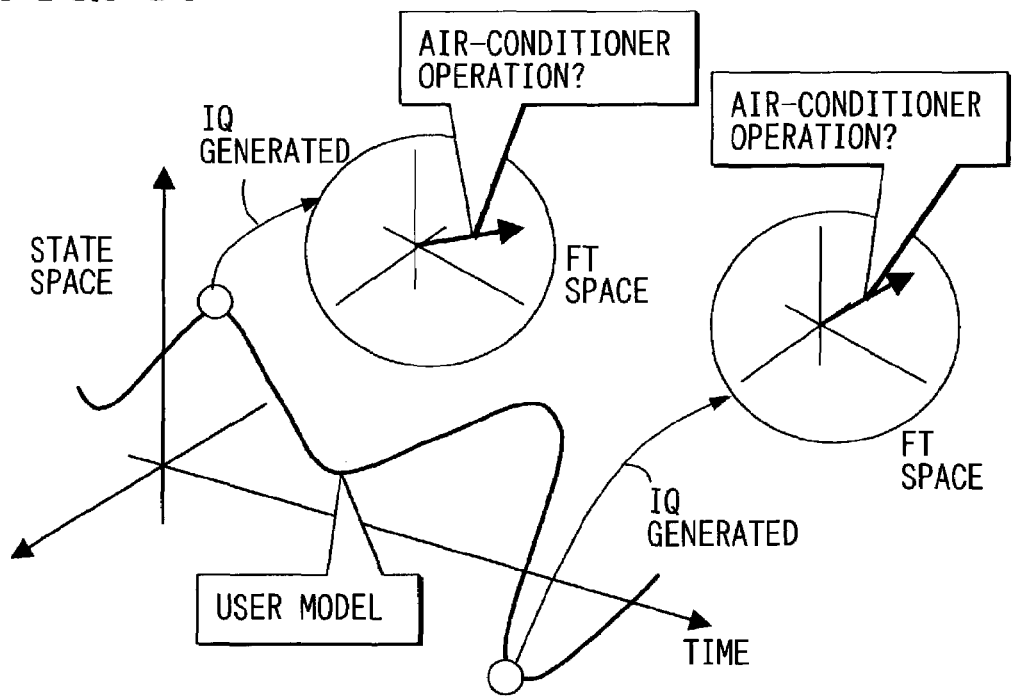
FIG. 37 is an explanatory diagram showing generation of an inquiry from a user model.

FIG. 36 shows a simplest time model as the user model 37, particularly, a case where a change in fatigue in one week is modeled. Based on the proposal of Japanese Patent Application No. 2000-285521, it can be considered that a user request is generated from a state point on a user locus in a state space specified by the user model 37 and an inquiry to the user terminal is generated as shown in FIG. 37. That is, in the form of an inquiry based on the user request, the user state space is mapped to the contents feature space.

<3>-6-(2) Change Regarding the Inside of the User Model 37

Characteristics of a user model are changed as follows.

An evaluation value EM of prediction accuracy of a user state by a user model is expressed by, for example, the following equation.

$$EM=(1/K)\Sigma |Xpi-Xdi|$$

where $Xpi$: prediction value of the user state based on the user model (with respect to the i-th component)

$Xdi$: state estimation value obtained from interaction (regarding the i-th component)

$\Sigma$: sum symbol of i=1 to K

A threshold $Xth$ is set and if $EM>Xth$, the user model 37 is corrected. As model correcting means, the following methods may be employed.

<3>-6-(2)-[1] To shift a present model on an axis (for example, time base)
<3>-6-(2)-[2] To scale a model along an axis
<3>-6-(2)-[3] To select, among some models, a model different from the present model <3>-6-(3) Change in Definition of the relation between the user model 37 and the outside Definition of the relation between states (corresponding to all of environment, conditions, request, state, aspect, and behavior) of a user model and a dependence vector is changed. For example, in an aspect {traffic jam in a resort}, there is a case such that priority on operation of TV, music, news, radio, and the like is higher than retrieval of a traffic jam avoiding path by a car navigation system depending on a user. In such a case, the dependence vector is changed so as to match the taste of the user. On the information center 5 side, there may be a change such that the priority of information for investors which was high at the time of the bubble economy is lowered at the present time of depression.

<3>-7 Retrieval of Contents in Read-Only Medium

There is a case such that fixed metadata are described as the contents of a read-only recording medium which cannot be changed such as a CD or DVD. A vector based on history of use of each user on the recording medium is learned by using another recording medium (hard disk or external memory). Examples of an object to be recorded are as follows.

<3>-7-(1) inquiry vector
<3>-7-(2) dependence vector
<3>-7-(3) contents retrieval result As specifically described above, according to the embodiment, an information retrieval system which inclusively functions is realized. Automatic generation and optimization of inquiry description, automatic generation and optimization of contents description, optimization of a search process, and updating of learning of a system can be achieved.

What is claimed is:

1. An adaptive information-retrieval system enabling a high-speed search to be performed on a computer, which includes using inquiry information corresponding to an inquiry and feature information added to contents to be retrieved, the inquiry information including at least one of image, sound and text, and at least a part of the inquiry information and the feature information including a vector relating to the at least one of image, sound and text;
   evaluating means for evaluating the contents by using the inquiry information and the feature information and for adaptively evaluating the contents by assigning the vector an attribute value from an available set of attribute values corresponding to at least one of the inquiry information and the feature information; and
   searching means for searching a database based on evaluated content results from the evaluation means, retrieving information based thereon and, presenting retrieved information to a user,
   wherein the searching means selects a search method by calculating a speedup ratio as an index of search time.

2. An adaptive information-retrieval system enabling a high-speed search to be performed on a computer, which includes using inquiry information corresponding to an inquiry and feature information added to contents to be retrieved, the inquiry information including at least one of image, sound and text, and at least a pan of the inquiry information and the feature information including a vector relating to the at least one of image, sound and text;
   evaluating means for evaluating the contents by using the inquiry information and the feature information and for adaptively evaluating the contents by assigning the vector an attribute value from an available set of attribute values corresponding to at least one of the inquiry information and the feature information; and
   searching means for searching a database based on evaluated content results from the evaluation means, retrieving information based thereon and presenting retrieved information to a user,
   wherein the evaluation means evaluates the contents on the basis of an inquiry vector included in the inquiry information and a feature vector included in the feature information, and
   wherein the evaluation evaluates the contents on the basis of classification of a feature space formed by the feature vector.

3. An adaptive information-retrieval system enabling a high-speed search to be performed on a computer, which includes using inquiry information corresponding to an inquiry and feature information added to contents to be retrieved, the inquiry information including at least one of image, sound and text, and at least a part of the inquiry information and the feature information including a vector relating to the at least one of image, sound and text;
   evaluating means for evaluating the contents by using the inquiry information and the feature information and for adaptively evaluating the contents by assigning the vector an attribute value from an available set of attribute values corresponding to at least one of the inquiry information and the feature information; and
   searching means for searching a database based on evaluated content results from the evaluation means, retrieving information based thereon and presenting retrieved information to a user,
   wherein the evaluation means evaluates the contents on the basis of an inquiry vector included in the inquiry information and a feature vector included in the feature information, and
   wherein the evaluation means modifies, by at least one of structuring and dividing, a feature space formed by the feature vector on the basis of the inquiry information.

4. An adaptive information-retrieval system enabling a high-speed search to be performed on a computer, which includes using inquiry information corresponding to an inquiry and feature information added to contents to be retrieved, the inquiry information including at least one of image, sound and text, and at least a part of the inquiry information and the feature information including a vector relating to the at least one of image, sound and text;
   evaluating means for evaluating the contents by using the inquiry information and the feature information and for adaptively evaluating the contents by assigning the vector an attribute value from an available set of attribute values corresponding to at least one of the inquiry information and the feature information; and
   searching means for searching a database based on evaluated content results from the evaluation means, retrieving information based thereon and presenting retrieved information to a user,
   wherein the evaluation means evaluates the contents on the basis of an inquiry vector included in the inquiry information and a feature vector included in the feature information, and
   wherein the evaluation means modifies, by at least one of re-locating and moving, the feature vector on the basis of the inquiry information.

5. An adaptive information-retrieval system enabling a high-speed search to be performed on a computer, which includes using inquiry information corresponding to an inquiry and feature information added to contents to be retrieved, the inquiry information including at least one of image, sound and text, and at least a part of the inquiry information and the feature information including a vector relating to the at least one of image, sound and text;
   evaluating means for evaluating the contents by using the inquiry information and the feature information and for adaptively evaluating the contents by assigning the vector an attribute value from an available set of attribute values corresponding to at least one of the inquiry information and the feature information; and searching means for searching a database based on evaluated content results from the evaluation means, retrieving information based thereon and presenting retrieved information to a user, wherein the evaluation means evaluates the contents on the basis of an inquiry vector included in the inquiry information and a feature vector included in the feature information, and wherein when a value of an attribute of the feature vector is an undefined value, the evaluation means evaluates the contents by using at least one of an average value and zero.

6. An adaptive information-retrieval system enabling a high-speed search to be performed on a computer, which includes using inquiry information corresponding to an inquiry and feature information added to contents to be retrieved, the inquiry information including at least one of image, sound and text, and at least a part of the inquiry information and the feature information including a vector relating to the at least one of image, sound and text;

evaluating means for evaluating the contents by using the inquiry information and the feature information and for adaptively evaluating the contents by assigning the vector an attribute value from an available set of attribute values corresponding to at least one of the inquiry information and the feature information; and searching means for searching a database based on evaluated content results from the evaluation means, retrieving information based thereon and presenting retrieved information to a user, wherein the evaluation means evaluates the contents on the basis of an inquiry vector included in the inquiry information and a feature vector included in the feature information, and wherein the evaluation means realizes a change in a viewpoint by changing a coordinate system at the time of mapping the inquiry vector into a feature space formed by the feature vector.

7. An adaptive information-retrieval system according to claim 6, wherein the coordinate system is changed on the basis of private information of the user.

8. An adaptive information-retrieval system according to claim 6, wherein the coordinate system is changed on the basis of a user model obtained by modeling user information.

* * * * *